(12) United States Patent
Bartos et al.

(10) Patent No.: US 9,888,020 B2
(45) Date of Patent: *Feb. 6, 2018

(54) GLOBAL CLUSTERING OF INCIDENTS BASED ON MALWARE SIMILARITY AND ONLINE TRUSTFULNESS

(71) Applicant: Cisco Technology, Inc., San Jose, CA (US)

(72) Inventors: Karel Bartos, Prague (CZ); Martin Rehak, Prague (CZ); Michal Sofka, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/231,118

(22) Filed: Aug. 8, 2016

(65) Prior Publication Data

US 2016/0344757 A1    Nov. 24, 2016

Related U.S. Application Data

(63) Continuation of application No. 14/612,623, filed on Feb. 3, 2015, now Pat. No. 9,432,393.

(51) Int. Cl.
*G06F 11/00* (2006.01)
*H04L 29/06* (2006.01)
(Continued)

(52) U.S. Cl.
CPC .... *H04L 63/1416* (2013.01); *G06F 17/30598* (2013.01); *G06F 21/55* (2013.01);
(Continued)

(58) Field of Classification Search
CPC . H04L 63/1416; H04L 63/20; H04L 63/1425; H04L 63/1433; H04L 63/1441;
(Continued)

(56) References Cited

U.S. PATENT DOCUMENTS 6,088,804 A    7/2000  Hill
7,096,496 B1 *  8/2006  Challener ............... G06F 21/31
                                              713/100

(Continued)

OTHER PUBLICATIONS

U.S. Appl. No. 14/612,623, filed May 4, 2016, Notice of Allowance, May 4, 2016.

(Continued)

*Primary Examiner* — Hosuk Song
(74) *Attorney, Agent, or Firm* — Hickman Palermo Becker Bingham LLP; Malgorzata A. Kulczycka

(57) ABSTRACT

In an embodiment, a method, performed by processors of a computing device for creating and storing clusters of incident data records based on behavioral characteristic values in the records and origin characteristic values in the records, the method comprising: receiving a plurality of input incident data records comprising sets of attribute values; identifying two or more first incident data records that have a particular behavioral characteristic value; using a malicious incident behavioral data table that maps sets of behavioral characteristic values to identifiers of malicious acts in the network, and a plurality of comparison operations using the malicious incident behavioral data table and the two or more first incident data records, determining whether any of the two or more first incident data records are malicious; and if so, creating a similarity behavioral cluster record that includes the two or more first incident data records.

20 Claims, 12 Drawing Sheets

(51) Int. Cl.
    *G06F 21/56* (2013.01)
    *G06F 21/55* (2013.01)
    *G06F 17/30* (2006.01)
(52) U.S. Cl.
    CPC ........ *G06F 21/566* (2013.01); *H04L 63/1408* (2013.01); *H04L 63/1425* (2013.01); *H04L 63/1433* (2013.01); *H04L 63/1441* (2013.01)
(58) Field of Classification Search
    CPC ............... H04L 63/145; H04L 63/1466; H04L 63/1408; G06F 21/577; G06F 17/30598; G06F 21/55; G06F 21/566
    USPC ....... 726/22–25; 713/188; 709/224–225, 229
    See application file for complete search history.

(56) References Cited

U.S. PATENT DOCUMENTS

| | | | |
|---|---|---|---|
| 7,159,237 B2 | 1/2007 | Schneier | |
| 7,178,166 B1 | 2/2007 | Taylor | |
| 7,594,270 B2 * | 9/2009 | Church | G06F 21/552 726/23 |
| 7,761,917 B1 | 7/2010 | Kumar | |
| 7,930,752 B2 | 4/2011 | Hertzog | |
| 8,161,552 B1 * | 4/2012 | Sun | G06F 21/566 726/22 |
| 8,201,257 B1 | 6/2012 | Andres | |
| 8,347,386 B2 * | 1/2013 | Mahaffey | G06F 21/564 726/23 |
| 8,424,072 B2 * | 4/2013 | Pullikottil | H04L 63/1425 380/232 |
| 9,251,345 B2 * | 2/2016 | Freeman | G06F 21/566 |
| 9,432,393 B2 * | 8/2016 | Bartos | H04L 63/1433 |
| 2016/0226904 A1 | 8/2016 | Bartos et al. | |

OTHER PUBLICATIONS

U.S. Appl. No. 14/612,623, filed Feb. 3, 2015, Office Action Feb. 26, 2016.

* cited by examiner

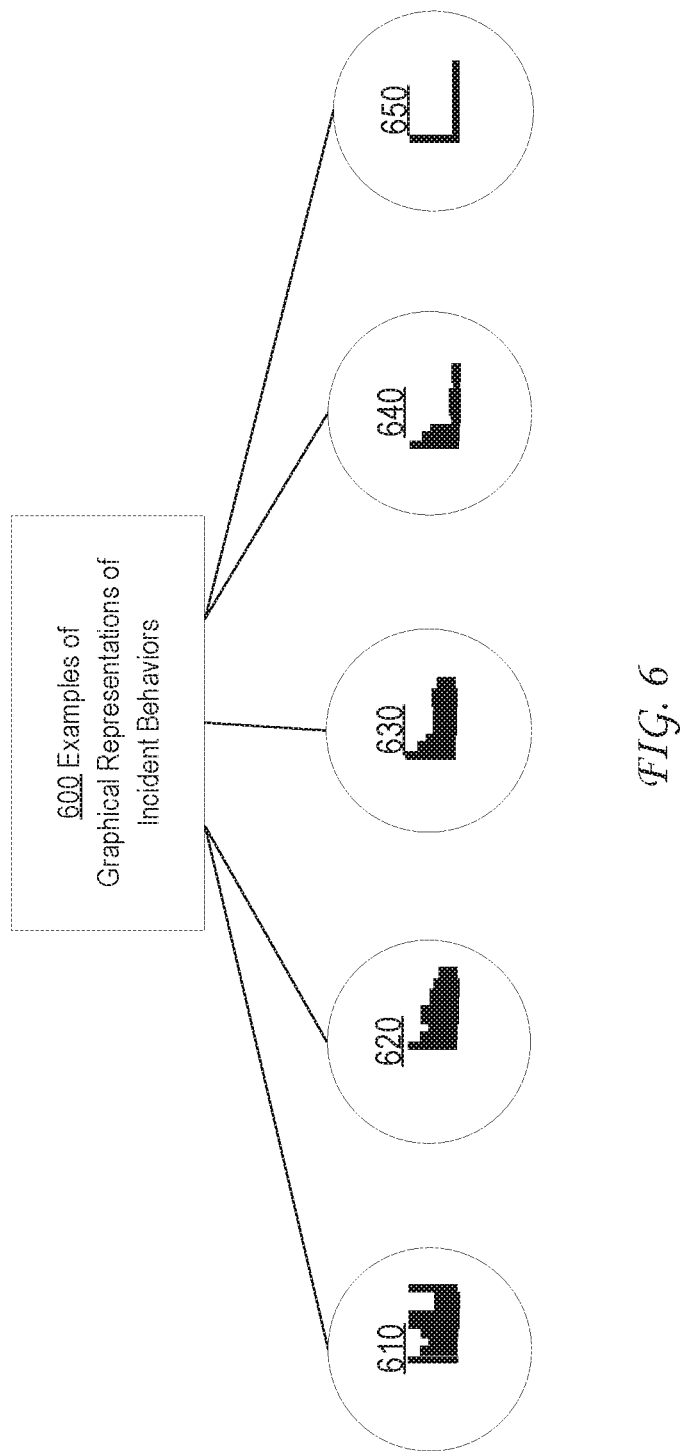

| 1102 Malicious Incident Behavioral Data Table | | |
|---|---|---|
| | 1103 First Malicious Act | 1123 Second Borderline Act |
| 1104 First Set | 1105 First Behavioral Characteristic Value<br>1106 Third Behavioral Characteristic Value<br>1107 Fourth Behavioral Characteristic Value | |
| 1124 Second Set | | 1125 Second Behavioral Characteristic Value<br>1126 Eight Behavioral Characteristic Value<br>1127 Ninth Behavioral Characteristic Value |
| ... | ... | ... |

*FIG. 11B*

| 1152 Malicious Incident Origin Data Table | | |
|---|---|---|
| | 1153 First Malicious Origin | 1163 Second Borderline Origin |
| 1154 First Set | 1155 First Origin Characteristic Value<br>1156 Second Origin Characteristic Value<br>1157 Fifth Origin Characteristic Value<br>1158 Eighth Origin Characteristic Value | |
| 1164 Second Set | | 1165 Third Origin Characteristic Value<br>1166 Seventh Origin Characteristic Value |
| ... | ... | ... |

*FIG. 11A*

GLOBAL CLUSTERING OF INCIDENTS BASED ON MALWARE SIMILARITY AND ONLINE TRUSTFULNESS

BENEFIT CLAIM

Continuation of application Ser. No. 14/612,623, filed Feb. 3, 2015, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

The present disclosure generally relates to an improved computer-implemented intrusion detection system. More specifically, the disclosure relates to techniques for creating and storing clusters of incident data records that are based on behavioral characteristic values and origin characteristic values that are included in incident data records, and using the clusters to improve detection of security faults or incidents in networked distributed computer systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Network security systems use information about data traffic to identify malicious incidents in communications networks. Unfortunately, some benign data traffic is often incorrectly classified as malicious, while some malicious traffic is often incorrectly classified as benign. Incorrect classifications may lead to incorrect reports and false alarms.

Inaccuracies in reports generated by network security systems are often caused by inabilities to correctly identify attacks caused by complex and sophisticated malware. For example, some of the attacks launched by herders of command-and-control (C2) enterprises are often extensively decentralized, and thus it may be difficult to identify their origin or their characteristics. Such attacks often remain undetected or incorrectly classified.

Problems with detecting malicious attacks may be compounded by various shortcomings of the network security systems. For example, some of the network security systems incorrectly prioritize the detected incidents or fail to associate correct context to the detected incidents. Other network security systems incorrectly group the incident data received from multiple networks or multiple systems.

BRIEF DESCRIPTION OF THE DRAWINGS

In the drawings:

FIG. 6 illustrates examples of graphical representations of incident behaviors;

FIG. 11A illustrates an example of a malicious incident origin data table;

FIG. 11B illustrates an example of a malicious incident behavioral data table;

DETAILED DESCRIPTION

Figure 1:
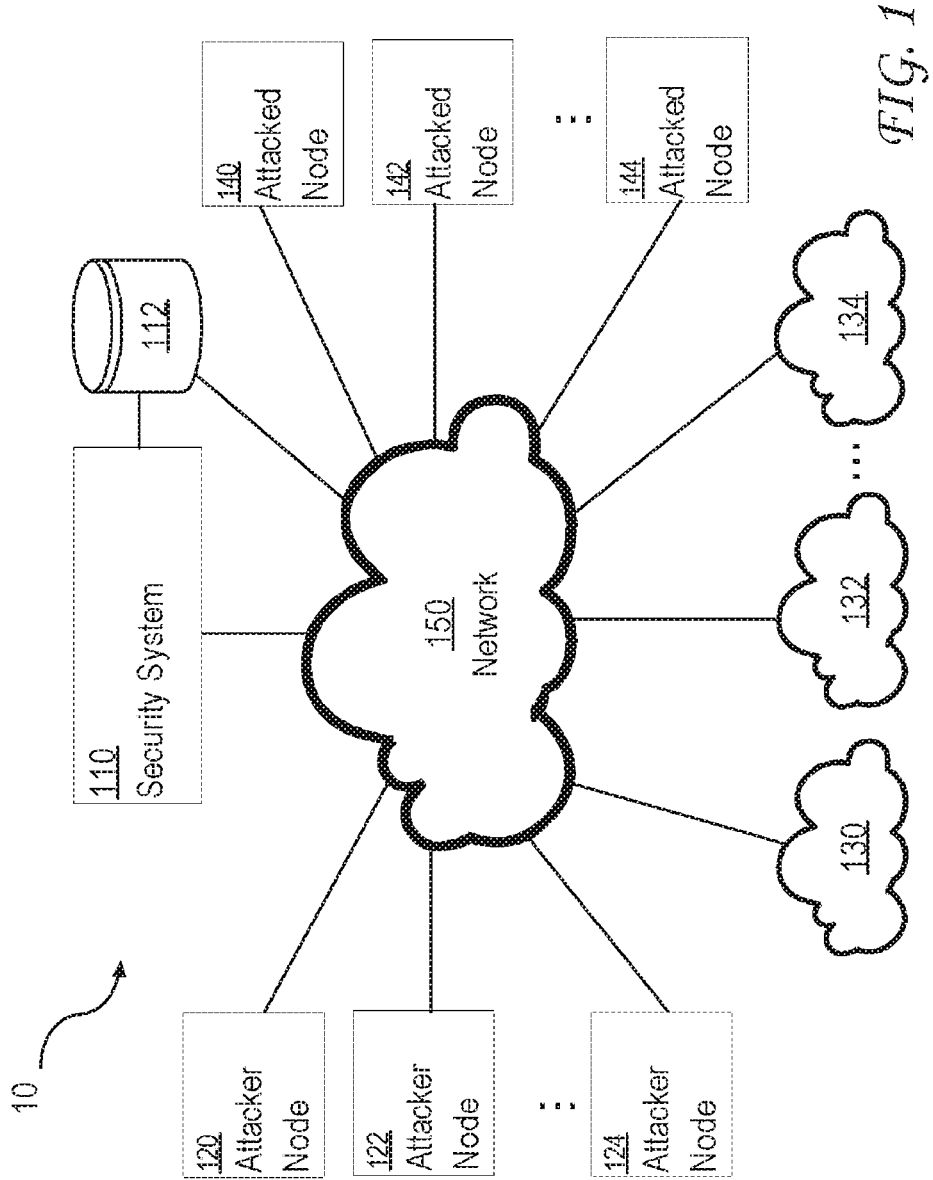
FIG. 1 illustrates an example of a network environment for implementing an approach for global clustering of incidents based on malware similarity and online trustfulness.

In the following description, for the purposes of explanation, numerous specific details are set forth in order to provide a thorough understanding of the present approach. It will be apparent, however, that the present approach may be practiced without these specific details. In other instances, well-known structures and devices are shown in block diagram form in order to avoid unnecessarily obscuring the present approach.

1. Overview

Embodiments provide for an approach for clustering similar network security incidents into high-level incident clusters. The clustering approach determines and takes into consideration contextual data associated with detected network incidents, and uses the contextual data to continuously cluster the incidents based on their trustfulness and behavioral similarities. The contextual information is also used to improve classification of the detected incidents and thus to improve efficiency of the intrusion detection systems.

In an embodiment, a data processing method is performed by one or more processors of a computing device configured as a server, for creating and storing clusters of incident data records based on behavioral characteristic values in the records and origin characteristic values in the records. In an embodiment, a method comprises receiving a plurality of input incident data records comprising sets of computer network attribute values determined based upon a plurality of incidents that have occurred in one or more computer networks. An incident data record of the plurality of input incident data records may comprise at least one or more behavioral characteristic values, a severity level value, and a confidence score value.

In an embodiment, a method comprises identifying two or more first incident data records that have a particular behavioral characteristic value stored in all of the two or more first incident data records. Identifying the two or more first incident data records may be performed using a malicious incident behavioral data table.

A malicious incident behavioral data table may be stored in a data storage device. The table may be used to map sets of behavioral characteristic values to identifiers of malicious acts in the network and a plurality of comparison operations using the malicious incident behavioral data table and the two or more first incident data records.

In response to determining that a first incident data record, from the two or more first incident data records, has been identified as malicious, a similarity behavioral cluster record is created and stored in a computer memory. The similarity behavioral cluster record may include the two or more first incident data records.

In an embodiment, severity level values that are stored in each of the two or more first incident data records are modified by increasing the severity level values by a first value.

In an embodiment, confidence score values that are stored in each of the two or more first incident data records are modified by increasing the confidence score values by a second value.

2. Structural Overview

Embodiments provide for an approach for correlating network incidents detected in one or more data communications networks based on behavioral properties of the incidents and information about sources that originated the incidents. Based on the correlation of the network incidents, the incidents may be clustered into one or more clusters. Some of the clusters may include clusters containing network incidents that are characterized by similar behaviors. Other clusters may contain network incidents that are originated by the sources known to launch malware attacks.

A cluster that contains network incidents that exhibit similar behaviors may be referred to as a similarity behavioral cluster, while a cluster that contains network incidents that are originated by the same source known to launch malware attacks may be referred to as a trustfulness cluster.

FIG. 1 illustrates an example of a network environment for implementing an approach for global clustering of incidents based on malware similarity and online trustfulness. In an embodiment, a network environment 10 comprises one or more attacker nodes 120, 122, 124, one or more attacked nodes 140, 142, 144, one or more security systems 110, and one or more databases 112. Attacker nodes 120, 122, 124, attacked nodes 140, 142, 144 and security systems 110 communicate with each other via a communications network 150, and optionally with additional computer networks 130, 132, 134. For example, one or more of attacker nodes 120, 122, 124 may launch a malware attack on one or more of attacked nodes 140, 142, 144 via communications network 150. Information about the attack incidents may be collected and processed by security system 110. Based on the processed information, security system 110 may implement an approach for global clustering of incidents to improve classification of the detected incidents.

In an embodiment, the term attacker node is understood very broadly to include any type of entity capable of launching a cyber-attack. Hence, the term attacker node may include not only any type of a physical device, but also a computer user, a computer domain, a computer network, a computer sub-network, and the like. For example, an attacker node may be not only a computer sever, a laptop, a PC, a workstation, or a tablet, but also a user who launched attacks on others from various computer devices, a computer domain from which attacks were launched, a computer network from which attacks were launched and/or a computer sub-networks from which attacks were launched. In fact, the term attacker node is not limited to computer devices, users, domains, networks and sub-networks; it may include any physical or non-physical entity capable of launching cyber-attacks.

For purposes of illustrating a clear example, network environment 10 comprises three attacker nodes 120, 122, 124, three attacked nodes 140, 142, 144, one network 150, one database 112, and three remote communications networks 130, 132, 134. However, other implementations may include any number of attacker nodes, attacked nodes, communications networks, databases, and remote communications networks.

2.1 Attacker Nodes and Attacked Nodes

Attacker nodes 120, 122, 124 and attacked nodes 140, 142, 144 may be individual network devices, workstations, servers, or other computing devices, as well as clusters of network devices or servers. Attacker nodes 120, 122, 124 and attacked nodes 140, 142, 144 may also be users workstations, laptops, smartphones, tablets and other user's specific devices. Moreover, attacker nodes 120, 122, 124 and attacked nodes 140, 142, 144 may be associated with local computer networks, wide area networks, or networks of companies or institutions and the like.

According to another example, one or more of attacker nodes 120, 122, 124 may launch one or more malware attacks on one or more of attacked nodes 140, 142, 144 via communications network 150. Information about the attack incidents may be collected and processed by a third party system (not shown), and the processed information may be communicated to security system 110. Based on the processed information, security system 110 may implement an approach for global clustering of incidents to improve the classification of the detected incidents.

In an embodiment, attacker nodes 120, 122, 124, attacked nodes 140, 142, 144 and security systems 110 communicate with each other via a communications network 150 and optionally, via one or more remote networks 130, 132, 134. For example, one or more attacker nodes 120, 122, 124 may launch a malware attack on one or more of attacked nodes 140, 142, 144 via communications network 150 and via one or more remote communications networks 130, 132, 134. Once an attack is launched, an incident data record, containing characteristics of the incident, may be created and provided to security system 110 and used to detect attacks in the manner further described herein.

2.2 Security System

Security system 110 may be configured to receive incident data records from attacked nodes 140, 142, 144, and/or other devices in a network. Security system 110 may be implemented in a single network device, a cluster of network devices, a distributed system, and the like. For example, security system 110 may be implemented in a standalone server, or may be implemented in a network of servers.

In an embodiment, attacked node 140 may detect an incident, collect information about the incident, create a record that contains one or more characteristics of the incident, store the incident data record in its local database, and transmit the incident data record to security system 110.

Based on received incident data records, security system 110 may implement an approach for global clustering of incidents to improve the classification of the detected incidents. For example, security system 110 may cluster the incident data records that contain the same particular behavioral characteristic value, which has been already known to indicate a malicious attack. The incident data records that contain such a particular behavioral characteristic value may be clustered to form a similarity behavioral cluster record.

A similarity behavioral cluster record may include two or more incident data records that contain a particular behavioral characteristic value that is known to indicate for example a malicious attack. Security system 110 may determine that the particular behavioral characteristic value may be known to indicate a malicious attack by using a malicious incident behavioral data table.

In an embodiment, security system 110 may cluster incident data records that contain the same particular origin characteristic value, which has been already known to indicate a malicious attacker. The incident data records that contain such a particular origin characteristic value may be clustered to form a trustfulness cluster record. In some instances, the characteristic is associated with data that indicates that the origin is a malicious attacker.

A trustfulness cluster record may include two or more incident data records that contain a particular origin characteristic value that is known to indicate a malicious attacker. Security system 110 may determine that the particular origin characteristic value may be known to indicate a malicious attacker by using a malicious incident origin data table

2.4 Incident Data Tables

One or more databases 112 may be configured to store data structures that support the operations described herein, including incident data records and mapping tables. For example, database 112 may be configured to store one or more malicious incident behavioral data tables used to identify behaviors that are malicious, borderline-malicious, benign, or the like. Malicious incident origin data tables may be used to identify origins that are known to launch malicious attacks.

2.4.1 Malicious Incident Origin Data Tables

A malicious incident origin data table may be generated by a security system, a system administrator, or a computer application. A malicious incident origin data table may contain a mapping between sets of origin characteristic values of incidents and identifiers of malicious attackers. For example, one set of origin characteristic values may contain, an Internet Protocol (IP) address of a server. Such a server may be already identified as a malicious attacker, a possible attacker, or an unlikely-attacker. If the particular IP address of a server has been identified as an IP address of a malicious attacker, then a system may create or modify a malicious incident origin data table to contain a mapping entry that maps the respective IP address onto an indicator of a malicious attacker, or the like. An example of a malicious incident origin data table is described in FIG. 11A.

2.4.2 Malicious Incident Behavioural Data Tables

A malicious incident behavioral data table may be generated by a security system, a system administrator, or a computer application. A malicious incident behavioral data table may contain a mapping between sets of behavioral characteristic values of incidents and identifiers of malicious acts in a network. For example, one set of behavioral characteristic values may contain characteristics specific to a data tunneling approach for tunneling a significant amount of data to or from a particular network. Such a data tunneling approach may be already identified as malicious, borderline malicious, benign, or other. If the data tunneling approach has been already identified as malicious, then a system may create or modify a malicious incident behavioral data table to contain a mapping entry that maps the respective behavioral characteristic values onto an indicator of a malicious attack, or the like. Examples of a malicious incident behavioral data table is described in FIG. 11B. The behavioral characteristic values may indicate the data tunneling approach.

2.5 Non-Confirmed Incidents

A non-confirmed incident is an incident whose classification as malicious, benign or the like has not been confirmed with a particular certainty. For example, once an incident is detected, the incident may be assigned an initial classification. An initial classification may be determined by any type of incident-detection-apparatus or application and using various methods and tools. However, since the initial classification is determined without performing an in-depth analysis, the initial classification may be provided without providing any assurance that the classification is correct. For example, an incident may be initially classified as borderline-malicious; however upon applying an in-depth analysis, the initial classification may be modified and/or changed to either indicate that the incident is malicious, or to indicate that the incident is benign.

2.6 Confirmed Incidents

A confirmed incident is an incident whose classification as malicious, benign or the like has been confirmed with a particular certainty. For example, an incident that was initially classified as malicious may become a confirmed incident if it has been determined with a particular certainty that the incident was indeed malicious.

A measure of a particular certainty may be determined in many ways. One way of determining a measure of the particular certainty is to compute a probability or likelihood that the classification assigned to an incident is correct. Another way of determining a measure of the particular certainty is to compute a score indicating how likely the assigned classification is correct. If the measure of the particular certainty exceeds a threshold value, then the classification may be confirmed. For example, if a probability that a particular incident is malicious exceeds 50%, then it may be confirmed that the incident is indeed malicious. However, if a probability that a particular incident is malicious is below 10%, then it may be confirmed that the incident is benign, not malicious. If a probability that a particular incident is malicious is between 10% and 50%, then it may be confirmed that the incident is borderline malicious.

2.7 Incident Clusters

In an embodiment, security system 110 clusters detected incidents. The process of detecting clusters of incidents may be performed continuously as new events are detected and identified. For example, the process may be performed each time new incidents are detected, new behaviors are identified, new sources known to launch malware attacks are recognized, and new classifications of incidents become available. For example, security system 110 may receive a plurality of input incident data records containing characteristics of a plurality of detected network incidents, and identify two or more first incident data records that have a particular behavioral characteristic value. Using a malicious incident behavioral data table, security system 110 may determine that the particular behavioral characteristic value is known to indicate a malicious attack. Based on that finding, security system 110 may create a similarity behavioral cluster record from the two or more first incident data records. Security system 110 may also modify severity levels and/or confidence scores of each of the two or more first incident data records in the cluster.

Furthermore, security system 110 may identify two or more second incident data records that contain a particular origin characteristic value. Furthermore, security system 110 may determine, using a malicious incident origin data table, that the particular origin characteristic value is known to indicate a malicious attacker. Based on that finding, security system 110 may create a trustfulness cluster record, and include the two or more second incident data records in the trustfulness cluster record. Security system 110 may also modify severity levels and confidence levels for each of the two or more incident records included in the trustfulness cluster record. Security system 110 may also determine a trustfulness level for the trustfulness cluster record. Various examples of record modifications are described below.

In an embodiment, security system 110 determines a severity level of an incident to indicate a severity of the incident. For example, the higher the severity level is, the more malicious the incident may be.

In an embodiment, security system 110 determines a confidence score of an incident to indicate how close the incident is to a corresponding classified behavior. For example, the higher the confidence level for an incident exhibiting malicious behavior is, the more likely the incident is malicious.

In an embodiment, security system 110 may determine a trustfulness level of a trustfulness cluster record to indicate how trusted or untrusted the cluster is. For example, if a trustfulness level associated with a particular trustfulness cluster record is relatively high, then the probability that the cluster contains incidents that have the associated incident records included in the cluster record may be relatively low. However, if the trustfulness level associated with a particular trustfulness cluster record is relatively low, then the probability that the cluster contains incidents that have the associated incident records may be relatively high.

Security system 110 may generate clusters that are at least partially overlapping. For example, upon receiving information about a plurality of detected network incidents, security system 110 may determine that some of the detected network incidents belong to two or more clusters. For example, some incidents may belong to both a trustfulness cluster and a similarity behavioral cluster.

In an embodiment, security system 110 determines sources of the incidents. The sources may include individual devices, individual networks, sub-networks, users, groups of users, and the like. Such sources may include the sources that have not been known as launching malware attacks, as well as the sources that have been known as launching malware attacks. The latter may include C2 servers, and the like.

Malicious behavior may be modelled using a variety of methods, including, but not limited to including, the statistical modelling NetFlow Analysis Tool from SolarWinds Worldwide, LLC, Austin, Tex. Other behavioral modelling may be provided by proxy logs and the like.

In an embodiment, security system 110 implements a clustering approach to improve the results obtained by incident detectors. Improvement of the results may be achieved by correlating the incidents that exhibit the same malicious behavior and/or the same origin known to be malicious. For example, the incidents may be correlated based on similarity of behaviors and characteristics of the origins that originated the incidents.

Security system 110 may also be configured to maintain a database of global online server trustfulness. The database may be built from all reported incidents, incident classifications, incident clustering, incident behaviors and incident origins. The clustered incidents may be organized in the database according to various criteria, and information about the clustered incidents may be used to generate incident reports. The reports may be presented in a variety of formats and may provide summaries of the incidents.

2.8 Incident Features

In an embodiment, a clustering mechanism includes two stages of processing various sets of incident feature data. The feature sets may include, but are not limited to including, the features describing malware behavior, including the incident volume, persistence, frequency, similarity between malware samples, and the like.

Other feature sets may include the features describing the identity of incident sources. An identity of a source may be identified by a source name, a source IP address, a source email address, and the like. Features describing malware properties may be used to cluster similar types of malicious behavior into incident clusters. For example, a cluster may consist of incidents generated by servers hosted at various locations. The servers do not have to be interconnected, do not have to communicate with each other, and do not have to be in any way associated with each other.

In an embodiment, security system 110 uses identity features to determine global trustfulness of servers. Trustfulness of a server that originated incidents included in a cluster may be updated according to information about other incident included in cluster. For example, if a particular trustfulness cluster includes two or more incidents, one of which has been originated from a source known to launch malicious attacks, then a trustfulness level for the entire trustfulness cluster, or the trustfulness level for one or more individual severs, may be decreased to reflect the fact that the source has been known to launch malicious attacks.

Using information about incident clusters, security system 110 may modify a priority of the already detected incidents or confirm the priority of the detected incidents waiting for further confirmation. For example, using the approach for a continuous clustering of incident data generated by an intrusion detection system, security system 110 may determine whether an incident initially classified as having a borderline-severity should be reclassified as being malicious. For instance, if one incident in a cluster exhibits behaviors that are similar to the behaviors that have been already classified as malicious, then the classification of all incidents in the cluster may be updated to malicious.

In an embodiment, security system 110 implements an approach for clustering network incidents to provide various types of information, including context information for the reported incidents. Such information is often unavailable from conventional approaches. Furthermore, security system 110 may implement an approach for generating a relatively accurate confirmation of the incident's classifications. Such information is rarely available when conventional approaches are implemented. Moreover, security system 110 may improve a confidence level of the classification of the detected incidents in comparison to the confidence levels provided by conventional methods.

3. Examples of Incidents

Figure 2:
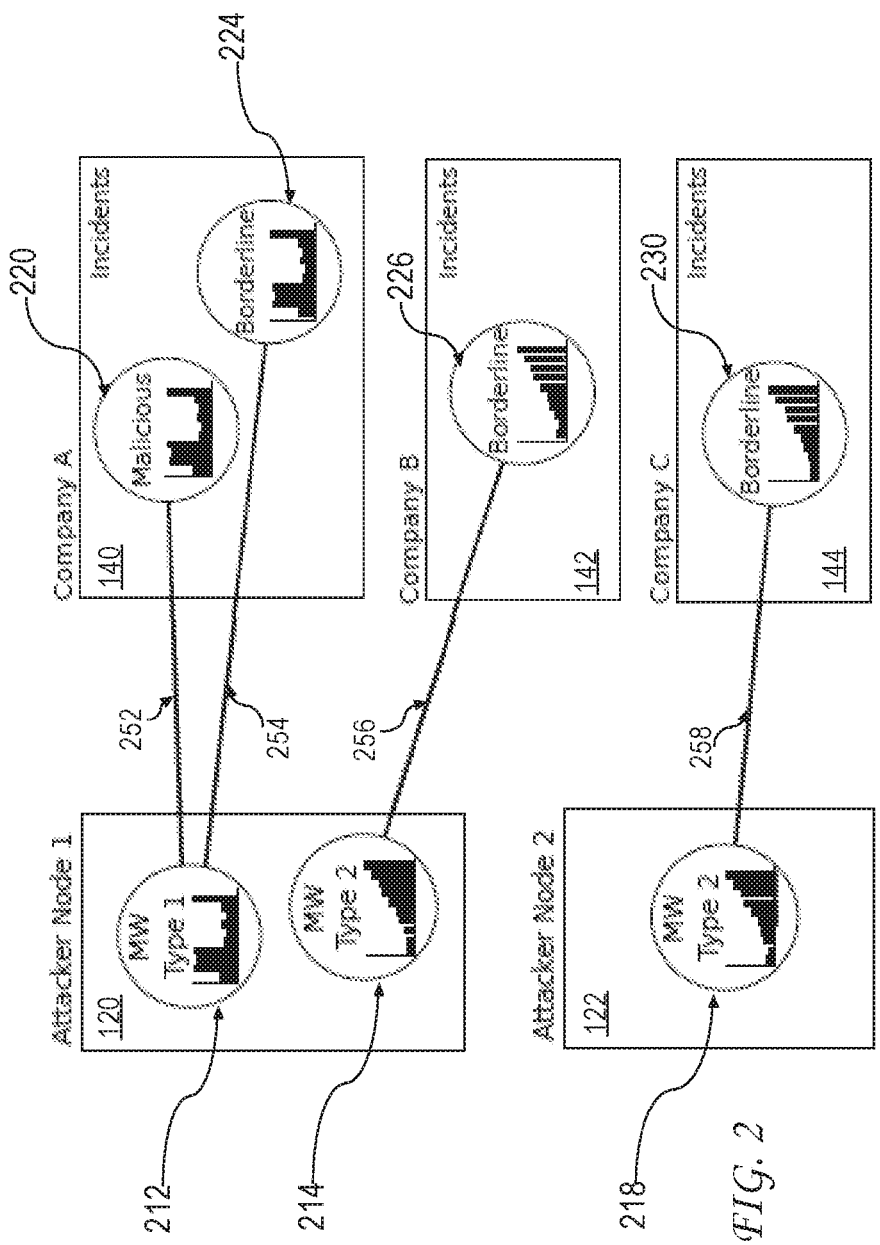
FIG. 2 illustrates an example of an approach for collecting information about network incidents in a multi-node network environment.

FIG. 2 illustrates an example of an approach for collecting information about network incidents in a multi-node network environment. In the example depicted in FIG. 2, various attacker nodes 120, 122 launch attacks on various attacked nodes 140, 142, 144.

Once an attack is detected and identified, the attack may be referred to as an incident. An incident is an attack detected and identified as taking place on an attacked node.

An incident may be detected and/or identified by an attacked node itself. For example, an attacked node may use one or more firewall applications configured to detect receiving malicious, unwanted or otherwise undesirable emails. Furthermore, an attacked node may use one or more spam detection application configured to intercept undesirable communications or data transfers. Moreover, an attacked node may use other types of applications that are configured to detect or identify other types of attacks launched by attacker nodes.

An incident may also be detected and/or identified by an entity other than an attacked node. For example, a security system server or node may be implemented in a network and configured to intercept and analyze communications exchanged between nodes in the network. The security system server may be configured to analyze the intercepted communications, determine whether the intercepted communications were originated by a node that was been blacklisted or otherwise known of launching attacks on the nodes. Furthermore, the security system server may be configured to analyze the intercepted communications by determining whether the intercepted communications contain or otherwise demonstrate a signature of a malicious attack or other unwanted activity. Moreover, the security system server may be configured to analyze the intercepted communications by determining whether the intercepted communications have been sent according to a communications pattern known to be malicious or unwanted. Other types of detecting attacks are described below.

In an embodiment, upon detecting that an incident has occurred on an attacked node, the attacked node or a security system server determines information specific to the incident and stores the information in a database. The information may include data about the type of the incident, the origin of the incident, the characteristics of the incident, and the like.

In an embodiment, information about an incident may be saved in a database as a record associated with an identifier assigned to the incident. Examples of various records are described below.

Each of one or more attacker nodes may launch one or more attacks on one or more attacked nodes. The attacks may have the same type or different types. The attacks may have the same characteristics or different characteristics. Attacks of the same type and/or the same characteristics may be launched by the same attacker on one or more attacked nodes. Furthermore, attacks of different types and/or characteristics may be launched by one or more attackers on the same attacked node. For example, one attacker node may launch one or more attacks of the first type on one or more attacked nodes, and one or more attacks of the second type on the one or more attacked nodes or some other attacked nodes.

As an example, assume that attacker node 120 launched an attack via a connection 252 on attacked node 140 of company A as seen in FIG. 2. Further assume that attacker node 120 also launched an attack via a connection 254 on attacked node 140, and an attack via connection 256 on an attacked node 142 of company B. Incident 220 has been identified as malicious or severe, while incidents 224, 226 have been identified as borderline malicious.

Furthermore, attacker node 122 launched an attack via a connection 258 on attacked node 142. Incident 258 has been identified as borderline severe. Determination of whether an attack is malicious or borderline malicious may be performed using various approaches. An attack may be malicious if for example, the attack brought a computer network down. An attack may be borderline malicious if for example, the attack caused short pauses in data communications in the computer network. One of the approaches for example, may be based on determining behavioral characteristics of the attack, and determining that the attack is malicious if the behavioral characteristics indicate so. Further it may be determined that the attack is borderline severe if the behavioral characteristics indicate so. Other approaches may use thresholds or other measures allowing distinguishing malicious attacks from borderline attacks.

In an embodiment, attacker node 120 performed two attacks of the same type 1 against company A and a different attack of the type 2 against company B. Only one of the attacks was detected and reported as a malicious incident, while the other attacks were reported as borderline incidents with low severity, awaiting further confirmation. Attacker node 122 performed an attack of type 2 against company C. The attack was detected as a borderline incident, and awaits further confirmation. In the depicted example, the attacker nodes 120, 122 are not interconnected with each other. In other examples, the attacker nodes may be at least partially interconnected.

In an embodiment, a clustering approach allows a computer to automatically generate confirmation about whether a detected incident has been correctly classified. Generating the confirmation may be accomplished by determining a cluster to which the incident belongs, and then either increasing or decreasing a confidence score associated with the incident. For example, if a security system creates a trustfulness cluster to include the incidents launched by attacker node 120, and one of the attacks launched by attacker node 120 has been already identified as malicious, then the borderline incidents associated with attacker node 120 may also be reclassified from borderline severe to malicious.

A clustering approach may also be configured to generate various types of confirmations. For example, a security system may create a similarity behavioral cluster for the incidents that exhibit similar behaviors. Based on the similarity between incidents in the cluster, the incidents that have been initially classified as borderline severe may be reclassified to malicious if at least one of the incidents in the similarity behavioral cluster has been classified as malicious. Detailed examples are provided in the following sections.

4. Initial Severity Levels of Incidents

In an embodiment, a network device, such as an attacked node or any other node in a network, detects an incident and collects data about the incident. The collected data may include various characteristics of the incident indicating when, how, by whom, and with what level of severity the incident was launched. For example, the data collected for a particular incident may include information indicating that the attack occurred at 11:55 AM PDT, that the attack severely impacted one or more network devices associated with a particular domain, that the attack caused a register buffer overflow in the one or more devices, that the attack was caused by an unsecure email sent from a particular IP address, and the like. A network device that collects data about an incident may disseminate the collected data to one or more security system 112.

In an embodiment, upon receiving data about a detected incident, security system 112 processes the received data. For example, security system 112 may associate a severity level value to the incident and/or a confidence score value to the incident.

In an embodiment, a severity level value is used to indicate a severity of the incident, and a confidence score value is used to describe a likelihood that an incident indeed corresponds to the behavior that has been determined and associated with the incident.

5. Initial Security Levels and Confidence Scores

Security system 112 may assign an initial or default security level and/or a score to an incident. For example, security system 112 may assign an initial severity level and/or an initial confidence score value to an incident based on the characteristics of the incident, the origin of the incident, and other information collected for the incident.

An initial severity level of an incident may indicate a severity of the incident and may be encoded as an alphanumeric textual code. For example, an initial severity level of an incident may be encoded to indicate whether the incident is malicious, borderline malicious, benign, or the like.

An initial confidence score value of an incident may be encoded as an alphanumeric textual code, and may indicate a likelihood that the incident indeed corresponds to the behavior that has been determined and associated with the incident. For example, an initial confidence score value of an incident may be encoded to indicate the probability that the incident preliminarily classified as malicious is indeed malicious.

6. Modifying Severity Levels and Confidence Scores

In an embodiment, security system 112 modifies an initial severity level and/or an initial confidence score value for an incident. For example, as security system 112 determines one or more incident clusters for the incident, the initial severity level and/or the initial confidence score value for the incident may be modified.

In some cases, an initial severity level and/or an initial confidence score value of an incident may be increased. For example, if security system 112 determines that an incident is clustered into a particular incident cluster used to group the incidents known to be malicious, then an initial severity level of the incident may be increased by some predetermined amount.

Furthermore, if security system 112 determines a probability that the incident indeed belongs to a particular incident cluster that includes malicious incidents, then an initial confidence score level of the incident may be increased by some predetermined amount.

In some other cases, an initial severity level and/or an initial confidence score value of an incident may be decreased. For example, if security system 112 determines that an incident is clustered into a particular incident cluster used to group the incidents known to be benign, then an initial severity level of the incident may be decreased by some predetermined amount.

Furthermore, if security system 112 determines a probability of the incident indeed belonging to the particular incident cluster used to group the incidents known to be benign, then an initial confidence score level of the incident may be increased by some predetermined amount.

In an embodiment, a severity level or severity is modified based on the severity or trustfulness of the corresponding cluster, while a confidence score level value or confidence score is increased incrementally and depends on several factors. Such factors may include the size of the cluster to which the incident belongs, or to which the incident has been classified. The size of a cluster may be determined based on the number of confirmed infected users or confirmed malicious domains associated with the incident. The factors may also include an indication of whether the cluster has been verified to be malicious.

A confidence score may be expressed as a percentage value, and may vary between 0% and 100%. For example, a confidence score of 0% may indicate that the incident unlikely belongs to a confirmed malware cluster, while a confidence score of 100% may indicate that the incidents does belong to a confirmed malware clusters.

Assigning initial severity levels and initial confidence score values, and modifying severity levels and confidence score values, may be performed manually or automatically by other independent systems. For example, a severity level of a cluster of an incident may be determined offline by a system administrator or a security system engineer. The determination may be based on the information about the clusters to which the incident has been assigned or based on other types of information.

A severity level of a cluster may also be determined automatically (online). For example, upon determining a particular incident cluster to which an incident is assigned, security system 112 may determine an average of the severity levels of all malicious or confirmed incidents in the cluster.

In an embodiment, a severity level and/or a confidence score can be modified for all incidents that occurred within a certain period of time. For example, security system 112 may determine a severity level and/or a confidence score for each incident that has been detected and identified within a certain period of time, or for each incident that has been detected and identified since a particular point in time. According to another example, security system 112 may determine severity level and/or confidence score for each incident that has been active since a particular point in time, or that has been detected no later than since a particular point in time.

This may be illustrated using the following example: if an activity related to a particular incident is still active but a particular cluster to which the incident belongs has changed since the beginning of the incident, then modifying the severity levels and confidence scores for the incidents that belong to the particular cluster may be performed according to the latest cluster values. However, if an incident that belongs to a particular cluster has become inactive, then modifying the severity levels and confidence scores for the incidents that belong to the particular cluster may be suspended or ended. Modifications of the severity levels a confidence scores for such incidents may be resumed if, for example, a membership of the particular cluster changes or any of the activities related to an incident that belongs to the particular cluster becomes active.

In an embodiment, severity levels and confidence scores may be modified by particular values. The particular values may be determined heuristically or empirically. For example, severity levels and/or confidence scores for incidents that belong to a particular cluster may be modified by the values that are determined as proportional to the scores associated with the incidents that belong to the particular cluster.

Alternatively, the severity levels and/or confidence scores for incidents that belong to a particular cluster may be modified by heuristically determined values, which later on may be modified and refined.

In an embodiment, severity levels and confidence scores may be modified by both heuristic and predefined values. For example, a severity level of an incident that belongs to a particular cluster may be initially determined based on a heuristically chosen initial severity level score, and then modified based on the scores associated with the incidents that belong to the particular cluster.

7. Incident Origin Data

Once an incident is detected, incident data may be collected and used to determine characteristics of the incidents. The characteristics may be grouped or categorized into different categories, and information about the characteristics along with the corresponding categories may be stored in one or more databases. For example, the information about the characteristics and the corresponding categories determined for an incident may be stored in a database record associated with an identifier assigned to the incident.

Characteristics determined for an incident may be categorized into one or more categories. The one or more categories may include, but are not limited to including, an origin of the incident, a type of the incident, and the like.

An origin of the incident indicates the originator of an attack detected as an incident on one or more attacked nodes. An originator of an attack may be interpreted as an attacker node, or in some situations, as a group of a plurality of attacker nodes. For example, an originator may be any of the attacker nodes 120, 122, 124.

In an embodiment, the term attacker node is understood very broadly and includes any type of entity capable of launching a cyber-attack on other entities. Hence, the term attacker node may include not only any type of a physical device, but also a user, a computer domain, a computer network, a computer sub-network, and the like. For example, an attacker node may be include not only a computer sever, a laptop, a PC, a workstation, or a tablet, but also a user who launched attacks on other from various computer devices, a computer domain from which attacks were launched, a computer network from which attacks were launched and/or a computer sub-networks from which attacks were launched. In fact, the term an attacker node is not limited to computer devices, users, domains, networks and sub-networks. Further, it may include any physical or non-physical entity capable of launching cyber-attacks. For example, it may include a virtual computer network, a software application configured to infect other applications and systems, and the like.

In an embodiment, information about an origin of the incident is represented using incident origin data. Incident origin data for an incident may uniquely identify the origin of the incident. Incident origin data for a particular incident may be used to encode information about the origin of the incident. For example, incident origin data for a particular incident may include an identifier of the origin of the incident, a description of the origin of the incident, or the like.

Figure 3:
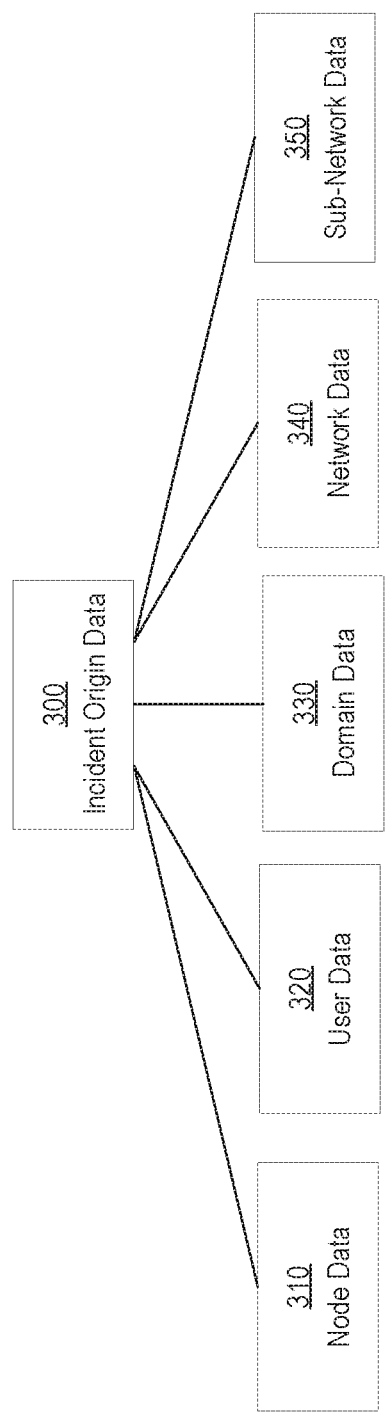
FIG. 3 illustrates examples of incident origin data.

FIG. 3 illustrates examples of incident origin data 300. The depicted examples are provided to merely illustrate non-limiting examples of various types of incident origin data. In the depicted example, incident origin data 300 may comprise one or more of incident origin node data 310, incident origin user data 320, incident origin domain data 330, incident origin network data 340 and incident origin sub-network data 350.

Incident origin node data 310 may be used to identify or otherwise describe a node or a group of nodes that launched an attack. A node or a group of nodes may be interpreted as a physical device, a virtual network, a virtual group of users or other entity that is known to launch attacks and that has some common characteristics. For example, incident origin node data 310 may indicate a particular router that originated or otherwise initiated a cyber-attack. Incident origin node data 310 may include any type of identifier that uniquely identifies the attacker. Examples of such identifiers are described in FIG. 4.

Incident origin user data 320 may be used to identify or otherwise describe one or more users who launched an attack. For example, incident origin user data 320 may indicate a particular user or a particular group of users who originated or otherwise initiated a cyber-attack. The user may be identified using various types of identifiers, some of which are described in FIG. 4.

Incident origin domain data 330 may be used to identify or otherwise describe one or more domains from which an attack has been launched. For example, incident origin domain data 330 may indicate a particular computer domain that includes one or more computing devices or users that launched a cyber-attack. Some examples of identifiers of incident origin domain data 330 are described in FIG. 4.

Incident origin network data 340 may be used to identify or otherwise describe one or more computer networks from which an attack has been launched. Incident origin network data 340 may include physical computer networks as well as virtual computer networks. For example, incident origin network data 340 may indicate a particular virtual private network from which a cyber-attack has been launched. Some examples of identifiers of incidents origin network data 340 are described in FIG. 4.

Incident origin sub-network data 350 may be used to identify or otherwise describe one or more physical or virtual computer sub-networks from which an attack has been launched. A physical or virtual sub-network may include one or more computing physical or virtual devices, one or more physical or virtual computer networks, and the like. For example, incident sub-network data 330 may indicate a particular local sub-network from which a cyber-attack has been launched. Some examples of identifiers of incidents origin sub-network data 350 are described in FIG. 4.

Examples of incident origin data depicted in FIG. 3 are to be interpreted as non-limiting examples of the origin data. Other examples of incident origin data not depicted in FIG. 3 may include, but are not limited to including, substantially any type of data that indicates, identifies, or allows determining a source of the incident. For example, incident origin data of an incident may include the data that indicates a bot herder, or any type of command-and-control (C2) center.

A bot herder is typically an owner of malware allowing the owner to control a botnet of infected computers. A botnet is a network of interconnected, autonomous computers that are infected with malicious software by a bot herder. Once the bot herder's software is installed in a computer, a bot is forced to carry out the commands of the bot herder, who can launch malicious attacks using some or all of the botnet's compromised computers. Since identifying a bot herder is often difficult, instead of relying on the identifiers of the computers that the bot herder is using, some codes (identifiers) may be generated for the bot herder itself.

8. Incident Origin Identifiers

Incident origin identifier uniquely identifies an origin of an incident. For example, an origin may be identified by an IP address of the origin, a domain name of the origin, and the like.

An identifier of an origin of an incident may be any type of an alphanumeric string that uniquely identifies the origin. For example, an identifier may be an IP address of a device from which an attack was originated, or an email address from which malicious messages were sent. Some of the examples of incident origin identifiers are described in FIG. 4.

Figure 4:
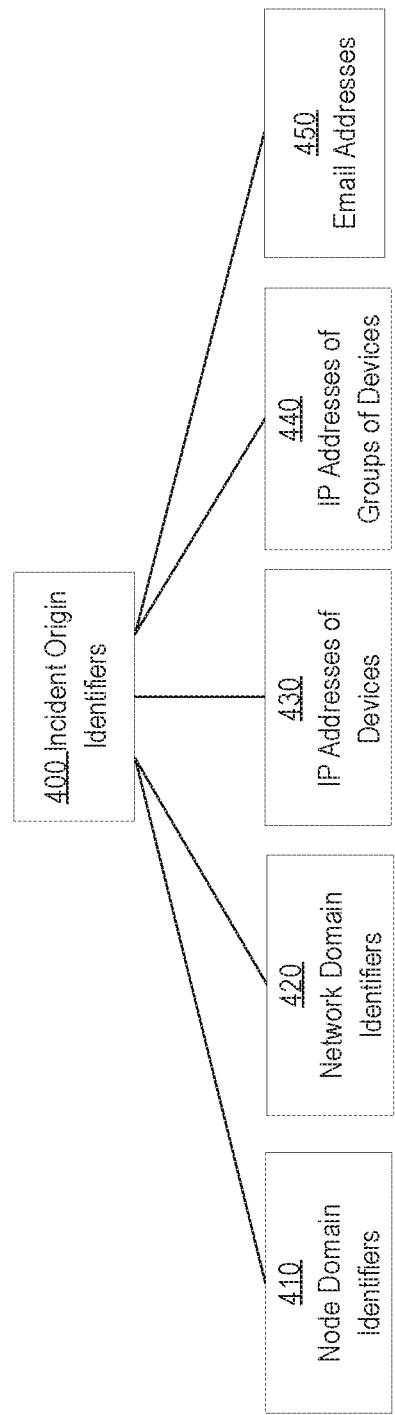
FIG. 4 illustrates examples of identifiers of incident origin data.

FIG. 4 illustrates examples of identifiers 400 of incident origin data. Examples depicted in FIG. 4 include incident origin node domain identifiers 410, incident origin network domain identifiers 420, incident origin IP addresses 430, incident origin IP addresses 440 of a groups of devices, and incident origin email addresses 450 of users who launched one or more attacks.

An incident origin node domain identifier 410 of an incident may be any type of an alphanumeric string that uniquely identifies an origin node that launched an attack detected as the incident. A domain name is a unique name that identifies an Internet resource such as a website. For example, a domain name may be represented as mywebsite-.com. Domain names are used in various networking contexts and application-specific naming and addressing purposes For example, referring to FIG. 2, if attacker node 120 launched an attack detected as an incident 220, then an incident node domain identifier of the attacker node 120 may be used as an incident node domain identifier 410 of incident 220. Examples of incident node domain identifiers may include the domains that have been detected by specialized applications and tools, including various spam assassin applications, junk filters, junk mail filters and the like.

An incident origin network domain identifier 420 of an incident may be any type of an alphanumeric string that uniquely identifies an origin network that launched an attack detected as the incident. For example, referring to FIG. 2, if attacker node 120 launched an attack detected as an incident 220, attacker node 122 launched an attack detected as an incident 230, and both attacker node 120 and attacker node 122 belong to the same network domain, then an incident network domain identifier of both attacker nodes 120, 122 may be used as an incident network domain identifier 420 of incidents 220, 232.

An incident origin IP address 430 of an incident may be any type of the Internet Protocol (IP) address that uniquely identifies an origin node that launched an attack detected as the incident. An IP address is a numerical label assigned to a device in a computer network that uses the Internet Protocol. Referring to FIG. 2, if attacker node 120 launched an attack detected as an incident 220, then an incident IP address of the attacker node 120 may be used as an incident IP address 430 of incident 220. Examples of incident node IP addresses may include a sequence of four numbers separated by a period, such as for instance 38.104.134.186.

An incident origin IP address of group devices 440 of an incident may be any type of the Internet Protocol (IP) address that uniquely identifies a group of devices that originated an attack detected as the incident. For example, if two attacker nodes, which launched an attack detected as an incident, form a group of devices and the group has one IP address assigned, then the IP address of the group may be used as an incident origin IP address 440. Examples of incident origin IP addresses of a group of devices 440 may include a sequence of three numbers separated by a period, such as for instance 38.0.0.1.

An incident origin email address 450 of an incident may be any type of the Internet email address that uniquely an entity that can send and receive electronic mails. For example, if a user attacker@attackernode.com launched an attack detected as an incident, then the email address attacker@attackernode.com may be used as an incident origin email address 450.

9. Incident Behavior Data

Upon detecting an incident, data is collected for the incident and one or more characteristics of the incident are determined and stored for the incident. Some of the characteristics include incident origin data, which is described above. Among other characteristics are characteristics that pertain to behavioral characteristics of the incident. The behavioral characteristics may be represented using incident behavior data.

Incident behavior data of an incident may include information about behavior and/or unique features of the incident. Incident behavior data may capture the information that allows determining when the incident occurred, in what circumstances the incident occurred, how often the incident has occurred, how persistently the incident occurs, what triggered the occurrence of the incident, and the like.

In an embodiment, incident behavior data include data about low-level features and high-level features. Low-level features as well as high-level features may be used to describe malware behaviors. Low-level features may include the features determined using simple tools and approaches, while high-level features may include the features determined using relatively complex tools and methodologies. For example, some low-level features may be determined by collecting information about network connections, network requests, and the like, while some high-level features may be determined by sophisticated analyzers of data traffic, such traffic sniffers, and the like.

Figures 5A, 5B:
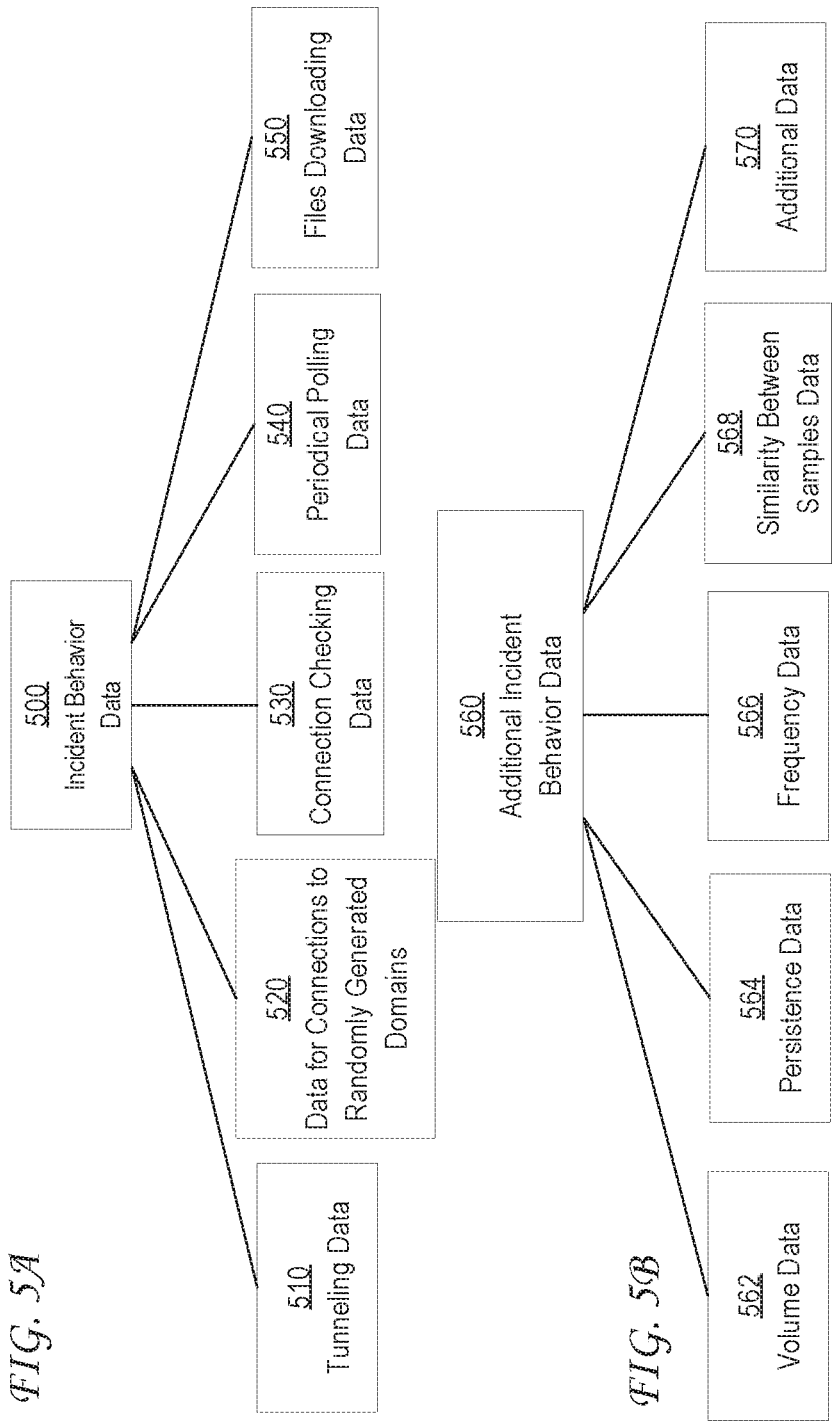
FIG. 5A illustrates examples of incident behavior data.
FIG. 5B illustrates examples of additional incident behavior data.

FIG. 5A illustrates examples of incident behavior data 500. The depicted examples include the data pertaining to low-level features, and include tunneling data 510, random domain contacting data 520, connection checking data 530, periodical polling data 540, and files downloading data 550. Tunneling data 510 contain information about tunnels established in the network; random domain contacting data 520 contain information about random attempts of access the network; connection checking data 530 contains information about testing the connections established in the network; periodical polling data 540 contains information about periodical polling of the status of the devices and the connections in the network; and files downloading data 550 contains information about file downloads performed by user of the network. The depicted examples are provided to merely illustrate the type of data used as low-level features. For example, files downloading data 550 may be collected using system-administrator tools and may indicate when large files have been downloaded or sent to a particular network, device or a user, how often large files are downloaded or sent to the particular entities, whether the particular entity initiated downloading of a large file, and the like.

FIG. 5B illustrates examples of additional incident behavior data 560. The depicted examples include the data pertaining to high-level features, and include volume data 562, persistence data 564, frequency data 566, similarity between samples data 568, and additional data 570. Volume data 562 may include any type of data indicating the volume of the transferred files and the transferred communications. Persistence data 564 may include any type of data indicating the counts of data access attempts. Frequency data 566 may include any type of data indicating the frequency in which the data access attempts were performed. Similarity between samples data 568 may include data indicating whether transmitted data exhibits any similarities to the already transmitted data. For example, similarity between samples data 568 may be obtained using data traffic analyzers that intercept data traffic, analyze the intercepted traffic and determine whether any pattern or similarity may be identified for the intercepted traffic.

Incident behavior data may be used to determine one or more clusters of incidents. As new incidents are detected, additional incident behavior data is obtained and used to update information about already identified clusters, to create new incident clusters, or both. For example, if two incident clusters of incidents have been created using the incident behavior data, then upon receiving additional incident behavior data, the system may determine that some incident clusters became inactive, and/or may create additional clusters.

Incident behavior data may also be used to cluster the incidents that appear to be initiated by botnets. Some botnets use Internet Relay Chat (IRC) channels as a medium for real-time Internet messaging. Other botnets may use peer-to-peer (P2P) technology. Such botnets are difficult to identify and shut down. Malware designed to spread through P2P communication channels does not need to check in with a centralized server for updates and commands. Rather, the infected machines communicate with one another to see the latest updates. A machine infected with such malware transfers the malware to the other computers, spreading the malware without the use of a centralized C2 server. By collecting incident behavior data 500, 560, the system may cluster the detected incidents even if they are launched as C2 attacks, and use the clustering approach to enhance classification of the incidents.

10. Graphical Representations of Incident Behaviors

Incident behaviors may be represented in a variety of ways, including various forms of graphical representation. Graphical representations may be useful in generating a graphical user interface (GUI) displayed on an operating console of the security system.

FIG. 6 illustrates examples of graphical representations of incident behaviors 600. Examples of graphical representations of incident behaviors 600 may be shown as two-dimensional graphs plotting a severity of an incident against a time axis. For example, an example 610 show a two-dimensional graph depicting that a particular incident was repeated several times within a certain period of time, and severity of the incident varied within a certain range.

An example 620 shows a two-dimensional graph depicting that a particular incident was repeated several times within a certain period of time, and severity of the incident varied at the first time period and decreased in the second time period.

An example 630 shows a two-dimensional graph depicting that a particular incident was repeated several times within a certain period of time, and severity of the incident was decreasing as the time was progressing.

An example 640 shows a two-dimensional graph depicting that a particular incident was repeated several times within a certain period of time, and severity of the incident was relatively high in the first period time, but it decreased in the second period of time.

An example 650 shows a two-dimensional graph depicting that a particular incident was repeated just once within a certain period of time, and severity of the incident was relatively high when the incident was detected.

Incident behaviors may be represented using other types of graphical representations. For example, the incidents may be labelled using alphanumerical strings, such as type 1, type 2, and the like. The incidents may also be shown using a variety of color schemes, or symbols known to depict different types of behavior. For example, an incident that appears to cause a security breach of a firewall may be graphically represented by a drawing depicting a wall and a X sign on the top of the wall. Other methods of graphically representing incident behaviors may also be implemented.

11. Trustfulness Clusters

Figure 7:
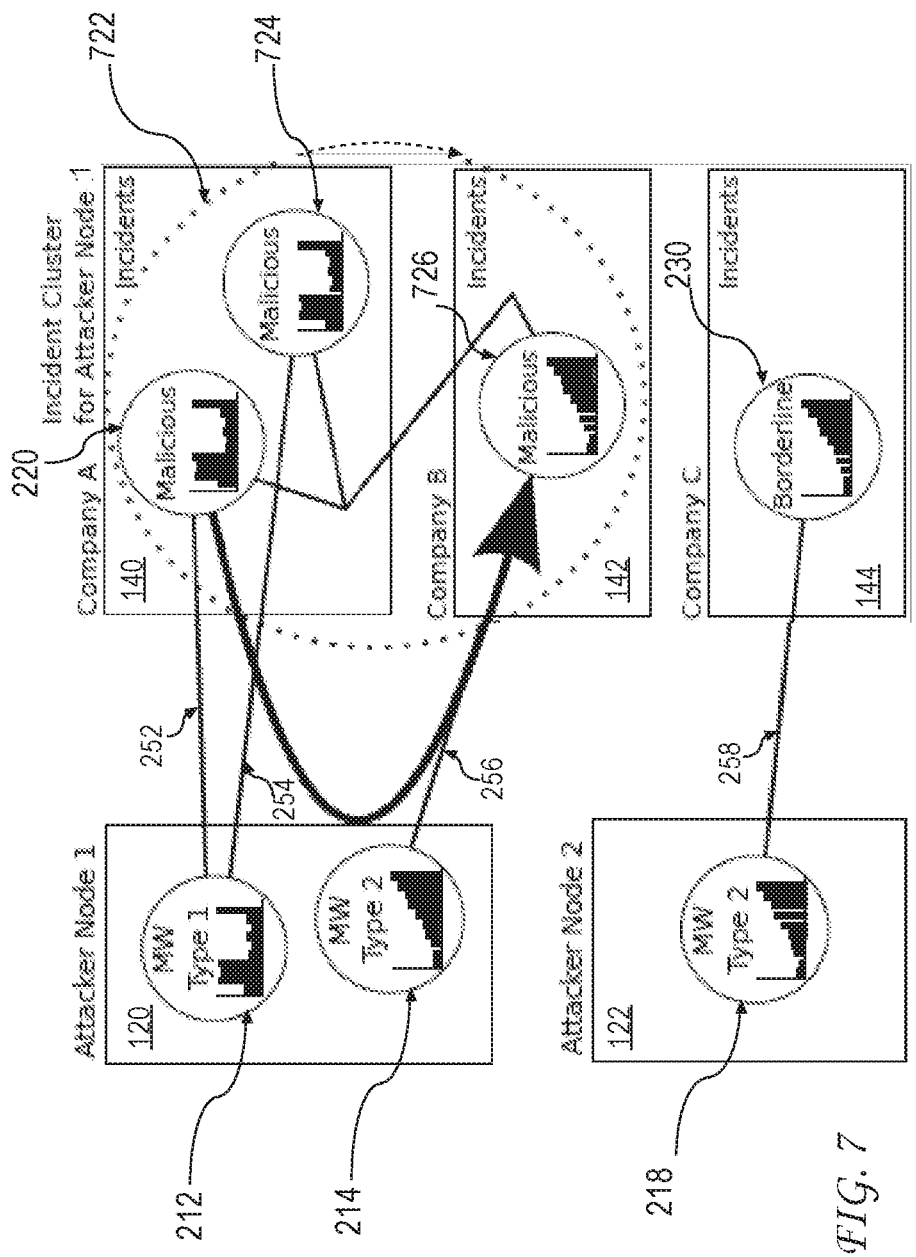
FIG. 7 illustrates an example of an approach for creating a trustfulness cluster.
Figure 8:
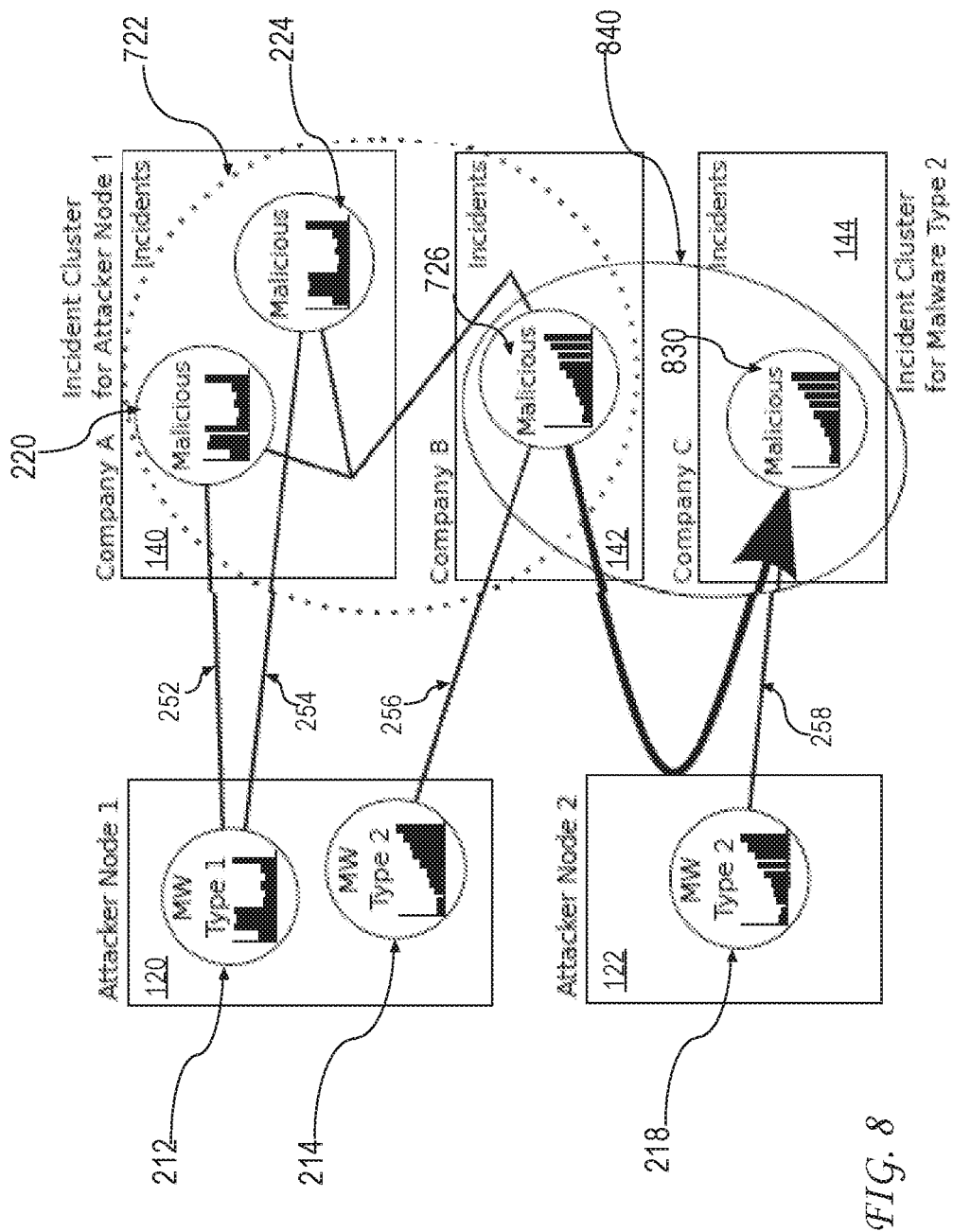
FIG. 8 illustrates an example of an approach for creating a similarity behavioral cluster.

Examples depicted in FIG. 7-8 illustrate various incident clustering methods, including creating trustfulness clusters and similarity clusters. In FIG. 7-8, attacker node 120 is also labelled as an attacker node 1, attacker node 122 is also labelled as attacker node 2, attacked node 140 is also labelled as company A, attacked node 142 is also labelled as company B, and attacker node 144 is also labelled as company C. In examples depicted in FIG. 7-8, each of the nodes (and each of the companies) may represent one or more network devices, one or more networks, one or more users, and the like. Hence, references made to an attacked node or a company may include one or more entities on which one or more attacks have been launched.

A trustfulness cluster 722 is depicted in FIG. 7 and FIG. 8. Similarity cluster 840 is depicted in FIG. 8. Even though FIG. 7, FIG. 8 depict only one trustfulness cluster 722 and one similarity cluster 840, various pluralities of incidents may be grouped into a one or more trustfulness clusters and/or one or more similarity clusters.

As described for FIG. 2, attacker node 120 performed two attacks of the same type 212 against attacked node 140 and an attack of the type 214 against attacked node 142. Only one of the attacks was detected and reported as a malicious incident, while the other attacks were reported as borderline incidents with low severity, awaiting further confirmation. Furthermore, attacker node 122 performed an attack of type 218 against attacked node 144. The attack was detected as a borderline incident, and awaits further confirmation.

In FIG. 2, FIG. 7, FIG. 8, an attack type 214 is the same type as an attack type 218. However, both attack types 214, 218 are different from attack type 212

An incident may be identified as malicious if, using some reference data or a rating scale, it can be determined that a severity of the incident is relatively high.

An incident may be identified as borderline if, using some reference data or a rating scale, it can be determined that a severity of the incident is relatively low. For example, an incident that appears to cause a security breach in a computer network may be considered malicious, while an incident that appears to slow down transmissions of data traffic to a particular device for 5 seconds may be considered borderline.

In an embodiment, an incident that has been identified with some certainty as borderline-malicious may be marked or tagged as an incident for which a confirmation is requested. Confirming whether an incident is indeed borderline malicious or malicious may be performed using a variety approaches, including an incident clustering approach.

In an embodiment, a clustering approach allows generating various types of confirmation. A non-limiting example of the confirmation may include a confirmation indicating whether a detected incident, which was originally classified as borderline severe, is malicious. This may be accomplished by determining a cluster that includes the incident, and, based on the feedback pertaining to the incidents that have been identified as malicious incidents and that belong to the cluster, lowering the trustfulness of the node that launched the incident. For example, if a security system creates a trustfulness cluster to include the incidents launched by attacker node 120, and one of the attacks launched by attacker node 120 has been already identified as malicious, then the borderline incidents associated with attacker node 120 may also be reclassified from borderline severe to malicious.

FIG. 7 illustrates an example of an approach for creating a trustfulness cluster. In the depicted example, the system created a trustfulness cluster 722 that includes the incidents that have been launched from the attacker suspected of launching malicious attacks. Trustfulness cluster 722 includes incidents 220, 724 and 726.

In an embodiment, a trustfulness cluster is created to include the incidents which have been caused by attacks launched from the same attacker node, and at least one of which has been confirmed as having certain characteristics. For example, if a particular attacker launched several attacks on various attacked nodes, and one of those attacks caused an incident detected as malicious, then a trustfulness cluster may be created to include the malicious incident and other incidents caused by the attacks launched by the attacker node even if not all the incidents were initially classified as malicious. Hence, if a particular attacker node launched two attacks, one of which caused an incident that has been confirmed as malicious and the other attacks caused incidents that have not been confirmed, then a trustfulness cluster may be created to include the confirmed malicious incident and other non-confirmed incidents caused by the attacks launched by the particular attacker node.

In the example depicted in FIG. 7, trustfulness cluster 722 was created to include incidents 220, 724 and 726 because incident 220 (caused by an attack launched by attacker node 120) has been confirmed as malicious and because incidents 724, 726 have been caused by attacks launched from the same attacker node 120.

Thus, because attacker node 120 launched an attack identified as malicious incident 220, borderline-malicious incidents 224 and 226 from FIG. 2, have been confirmed as malicious incidents 724, 726, respectively, because they were launched from attacker node 120 confirmed as known to launch malicious attacks. By confirming incidents 224, 226 to malicious incidents 724, 726, respectively, incidents 724, 726 have been included into trustfulness cluster 722 along with incident 220.

In an embodiment, including an incident into a particular trustfulness cluster includes modifying a severity level value and/or a confidence score value associated with the incident. For example, if an incident was initially classified as borderline-malicious, but later confirmed to be malicious, then a severity level value associated with the incident may be increased by some predetermined value. Furthermore, if a confidence score value is associated with the incident, and the classification of the incident has been confirmed, then the confidence score value associated with the incident may also be increased.

According to another example, if an incident was initially classified as malicious, but later confirmed to be benign, then a severity level value associated with the incident may be decreased by some predetermined value. Furthermore, if a confidence score value is associated with the incident, and the classification of the incident has been confirmed, then the confidence score value associated with the incident may also be decreased.

In an embodiment, a trustfulness cluster may have an associated severity level value and/or an associated confidence score value. These values may be modified as new incidents are added to the cluster, as some incidents are removed from the cluster, or when the cluster is determined to be inactive or dormant. For example, an associated confidence score value of a particular trustfulness cluster may be computed as an average value of the confidence score values associated with the incidents included in the cluster. Also, if new incidents are added to a particular trustfulness cluster of malicious incidents, then the associated confidence score values of the added incidents may be used in re-computing the confidence score value associated with the particular trustfulness cluster.

Trustfulness clusters may be created for various types of incidents. For example, trustfulness clusters may be created for incidents that have been confirmed as malicious, other trustfulness clusters may be created for incidents that have been confirmed as benign, and so forth.

In an embodiment, one or more different types of trustfulness clusters can be created for a plurality of incidents. For example, one or more trustfulness clusters for malicious incidents may be created for those incidents from the plurality that have been confirmed to be malicious. Furthermore, one or more trustfulness clusters may be created for those incidents that have been confirmed to be borderline-malicious. Moreover, one or more trustfulness clusters may be created for those incidents that have been confirmed to be benign, and so forth.

12. Similarity Clusters

As described for FIG. 2, attacker node 120 performed an attack of the type 212 against attacked node 140 and an attack of type 214 against attacked node 142. The attacks were detected and reported as borderline-malicious incidents 224, 226. Furthermore, attacker node 122 performed an attack of type 218 against attacked node 144. The attack was detected as a borderline incident 230, and awaited further confirmation.

As described for FIG. 7, by confirming incidents 224, 226 to malicious incidents 724, 726, respectively, incidents 724, 726 were included into trustfulness cluster 722. Hence, trustfulness cluster 722 includes incidents 220, 724 and 726, each of which is confirmed to be malicious. However, incident 230 still awaits further confirmation. The result of confirming the severity of incident 230 is depicted in FIG. 8.

FIG. 8 illustrates an example of an approach for creating a similarity behavioral cluster 840. Attacker nodes 120, 122 in FIG. 2 correspond to attacker nodes 120, 122 in FIG. 7 and FIG. 8. Attached nodes 140, 142, 144 in FIG. 2 correspond to attacked nodes 140, 142, 144 in FIG. 2 and FIG. 7. Trustfulness cluster 722 in FIG. 7 corresponds to trustfulness cluster 722 in FIG. 8. Trustfulness cluster 722 includes incidents, 220, 724 and 726. Similarity cluster 840 includes incidents 726 and 830.

In an embodiment, a similarity cluster 840 is created to include those incidents that have been caused by attacks of the same type, but at least one of which has been already confirmed to have certain characteristics. For example, if a particular incident has been already confirmed as malicious and was caused by an attack of a certain type, then other incidents caused by attacks of the same certain type may be included into the same similarity cluster as the particular incident. Hence, even if the incidents were caused by attacks launched by different attackers, as long as the incidents were caused by the attacks of the same type and one of them has been confirmed as having certain characteristics, such incidents may be included in the same similarity cluster. For example, if various attacker nodes launched several attacks of the same type, and one of the attacks caused an incident that has been classified as malicious, then the system may create a similarity cluster to include all such attacks even though they might have been caused by attacks launched by different entities.

In the example depicted in FIG. 8, similarity cluster 840 was created to include incidents 726 and 830 because they were both caused by attacks of the same type (214, 218). In particular, once incident 726 has been confirmed as malicious and included in similarity cluster 840, other incidents caused by attacks of the same type 214, 218 may also be included in the similarity cluster 840.

Thus, because incidents 726 and 830 have been caused by attacks of the same type 214, 218 and incident 726 has been confirmed as malicious, incident 830 is being confirmed as malicious even though it was initially classified as borderline-malicious and even though it was caused by an attack launched from the attacker other than the attacker that cause incident 726. By confirming incident 230 to malicious incident 830, incident 830 has been included into similarity cluster 840 along with incident 726.

In an embodiment, including an incident into a particular similarity cluster includes modifying a severity level value and/or a confidence score value associated with the incident. For example, if an incident was initially classified as borderline-malicious, but later confirmed to be malicious, then a severity level value associated with the incident may be increased by some predetermined value. Furthermore, if a confidence score value is associated with the incident, and the classification of the incident has been confirmed, then the confidence score value associated with the incident may also be increased.

According to another example, if an incident was initially classified as malicious, but later confirmed to be benign, then a severity level value associated with the incident may be decreased by some predetermined value. Furthermore, if a confidence score value is associated with the incident, and the classification of the incident has been confirmed, then the confidence score value associated with the incident may also be decreased.

In an embodiment, a similarity cluster may have an associated severity level value and/or an associated confidence score value. These values may be modified as new incidents are added to the cluster, as some incidents are removed from the cluster, or when the cluster is determined to be inactive or dormant. For example, an associated severity level value of a particular similarity cluster may be computed as an average value of the severity level values associated with the incidents included in the cluster. Also, if new incidents are added to a particular similarity cluster of malicious incidents, then the associated severity level values of the added incidents may be used in re-computing the severity level value associated with the particular trustfulness cluster.

In an embodiment, one or more different types of similarity clusters can be created for a plurality of incidents. For example, one or more similarity clusters for malicious incidents may be created for those incidents from the plurality that have been confirmed to be malicious. Furthermore, one or more similarity clusters may be created for those incidents that have been confirmed to be borderline-malicious. Moreover, one or more similarity clusters may be created for those incidents that have been confirmed to be benign, and so forth.

13. Creating a Trustfulness Cluster

Figure 9:
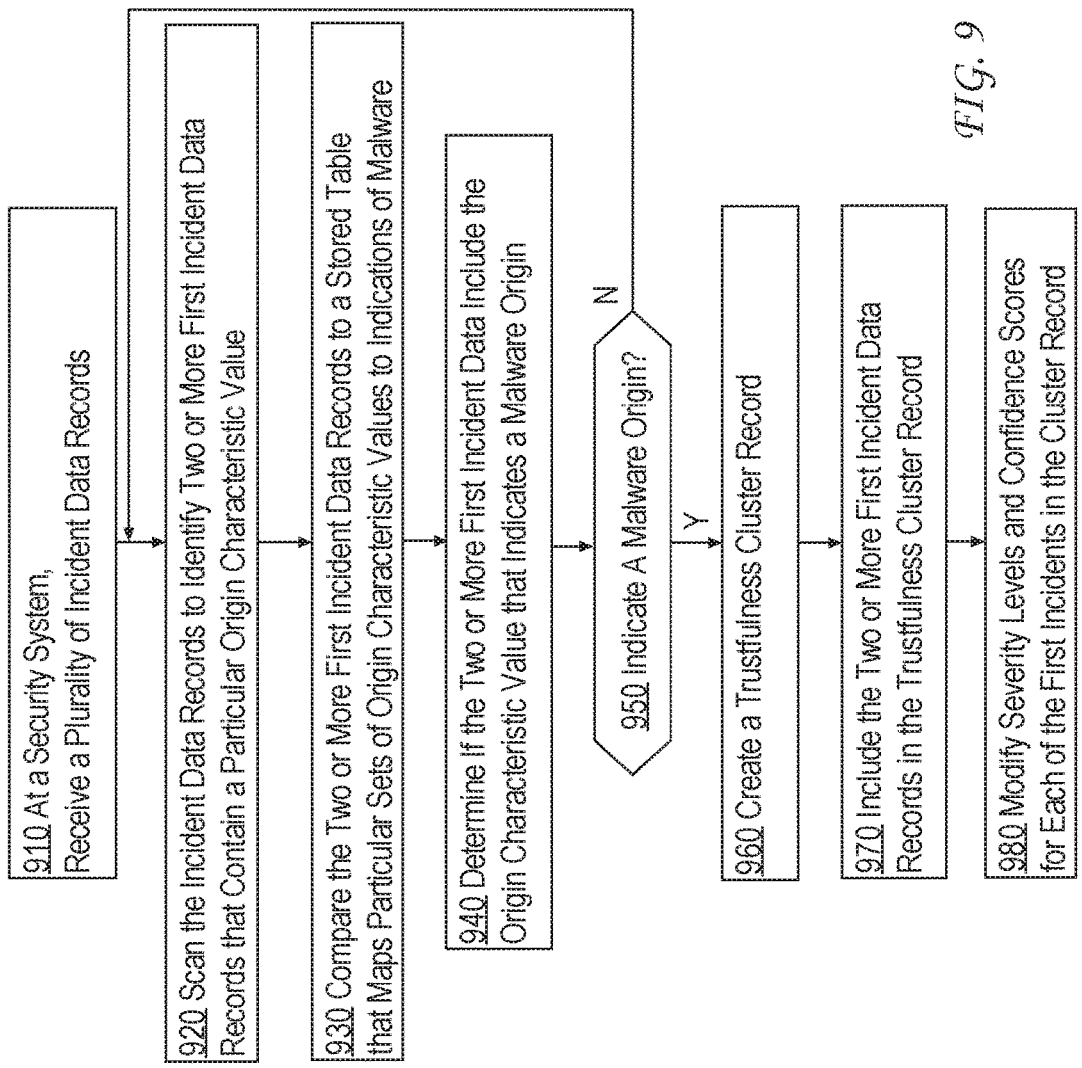
FIG. 9 illustrates a flow chart of an approach for creating a trustfulness cluster.

FIG. 9 illustrates a flow chart of an approach for creating a trustfulness cluster. The flow chart depicts a workflow that may be executed for any combination of non-confirmed and confirmed incidents. For example, initially the workflow may be executed to create at least one trustfulness cluster from a plurality of detected, but non-confirmed incidents. Furthermore, the workflow may be executed to modify the already created trustfulness clusters or to add new trustfulness clusters as some of the non-confirmed incidents became confirmed. Moreover, the workflow may be executed to modify the already created trustfulness clusters or to add new trustfulness clusters as some of the clusters became inactive or obsolete. The process may be also repeated after similarity behavioral clusters are created or modified.

Once at least one similarity behavioral cluster is created, additional similarity behavioral clusters may be created. The clusters may overlap or may be separated from each other. As the process is repeated, some clusters may become inactive or obsolete, while others may be become larger or smaller. Furthermore as new incidents are detected, new clusters may be created or the existed clusters may be modified.

In step 910, a plurality of input incident data records are received at a security system. In an embodiment, the plurality of input incident data records includes records of any number of non-confirmed incidents and records of any number of confirmed incidents as long as at least two incident data records are received. It should be appreciated that in some situations, a similarity behavioral cluster may be created based on just one incident data record.

In step 920, a plurality of input incident data records are scanned to identify two or more first incident data records that contain a particular origin characteristic value. For example, the plurality of input incident data records can be scanned to identify two or more first incident data records that contain the origin characteristic value corresponding to an identifier of a particular attacker node, such as attacker node 120 in FIG. 2.

In step 930, two or more first incident data records that contain a particular origin characteristic value are compared to a stored table that maps particular sets of origin characteristics values to indications of malware. For example, the two or more first incident data records that contain the identifier of a particular attacker node may be compared to a malicious incident origin data table 1152 of FIG. 11A to determine whether the malicious incident origin data table 1152 contains an indication that the particular attacker node is known to launch malicious attacks.

In step 940, using a table such as a malicious incident origin data table 1152 of FIG. 11A, the process determines whether two or more first incident data includes the origin characteristic value that indicates an attacker node known to launch malicious attacks.

In step 950, the process determines whether the test performed in step 940 returned a positive result. If so, the process proceeds to step 960. Otherwise, the process proceeds to step 920, in which a plurality of input incident data records is scanned again to identify different two or more first incident data records that contain a particular origin characteristic value. For example, the process may scan the incident data records to identify this time two or more first incident data records that contain the origin characteristic value corresponding to an identifier of an attacker node 122 in FIG. 2.

In step 960, a trustfulness cluster record is created. In an embodiment, creating a trustfulness cluster record includes allocating a block of memory or disc space, associating a pointer and or other location identifier to the block of memory or the disc space, and configuring the block of memory or disc space for storing the trustfulness cluster record. Furthermore, the process may generate an identifier for the trustfulness cluster and store the identifier in the trustfulness cluster record.

In an embodiment, creating a trustfulness cluster record includes generating an initial severity level value and an initial confidence score and including them in the trustfulness cluster record. Generating an initial severity level value may include setting the initial severity level value to a predetermined initial level value, while generating an initial confidence score may include setting the initial confidence score to a predetermined initial score value.

In step 970, two or more first incident data records, which contain an identifier of a particular attacker node that launched attacks for which the two or more first incident data records were created, are included in a trustfulness cluster record.

In an embodiment, once steps 960, 970 are performed, a trustfulness cluster record may include an identifier of the trustfulness cluster, an initial severity level value, an initial confidence score, and two or more first incident data records containing the identifier of the particular attacker that launched attacks for which the two or more first incident data records were created.

In step 980, at least one initial severity level value and at least one initial confidence score are modified. For example, an initial severity level value for a particular first incident may be modified by computing a sum of all initial severity level values associated with the first incidents, and dividing the sum by a count of the first incidents included in the trustfulness cluster. The obtained result may be associated with a particular first incident data record associated with the particular first incident and stored in association with the particular first incident record in a trustfulness cluster record.

Furthermore, an initial confidence score for a particular first incident may be modified by computing a sum of all initial confidence scores associated with the first incidents, and dividing the sum by a count of the first incidents included in the trustfulness cluster. The obtained result may be included in a particular first incident data record associated with the particular first incident or stored in association with the particular first incident record in a trustfulness cluster record.

The process described above is executed for creating a trustfulness cluster for incidents most likely caused by attacks launched by attackers known to launch malicious attacks. However, the process may also be executed for creating other types of clusters, including a trustfulness cluster for incidents most likely caused by attacks launched by attackers known to launch benign attacks, or the like. In fact, the process described in FIG. 9 may be used to create any type of trustfulness cluster.

The above workflow process may be repeated multiple times. Each time the workflow process is repeated, the previously determined level values and scores may be interpreted as initial level values and initial scores. By repeating the workflow process multiple times, the selection and content of the trustfulness clusters may be refined and improved.

14. Creating a Similarity Behavioral Cluster

Figure 10:
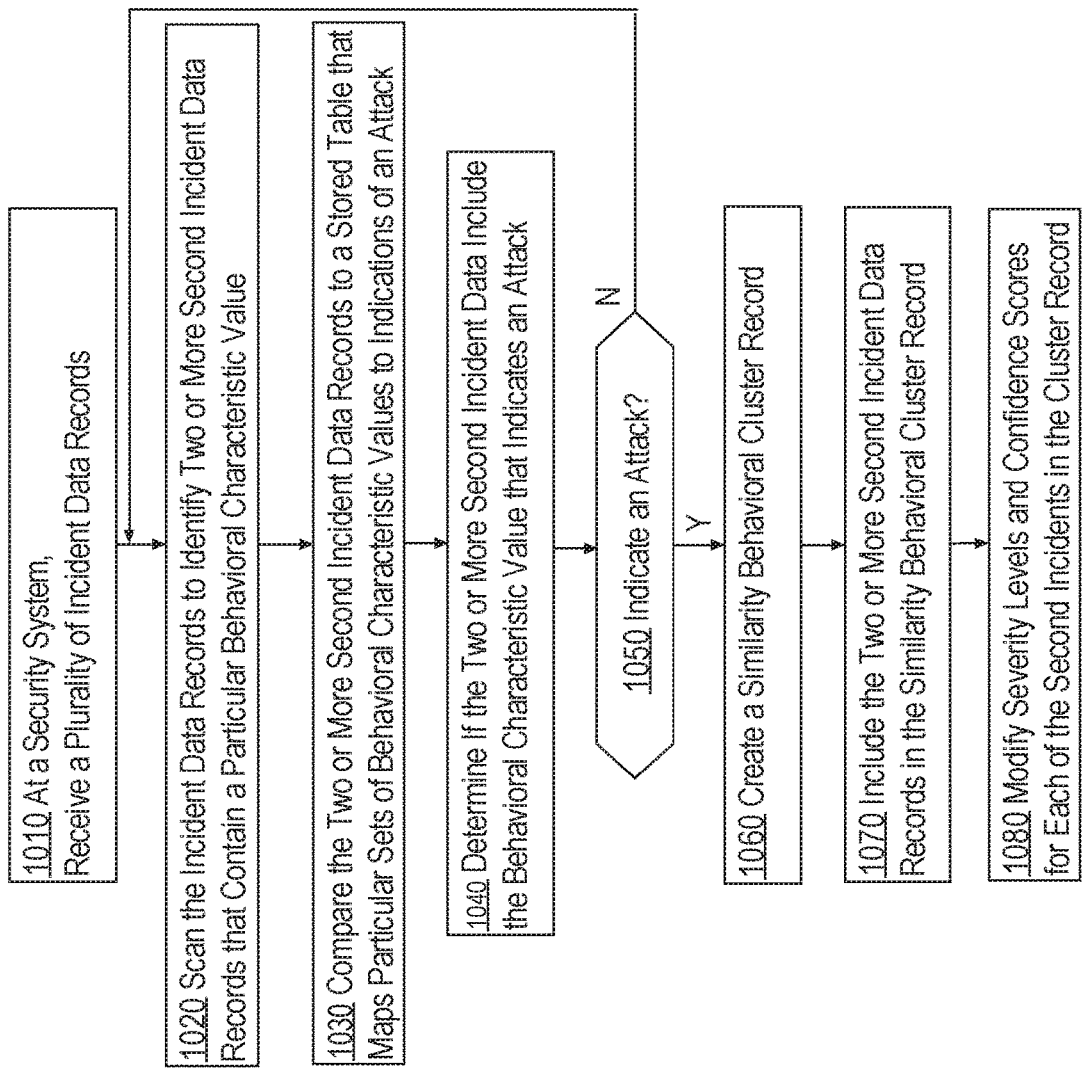
FIG. 10 illustrates a flow chart of an approach for creating a similarity behavioral cluster.

FIG. 10 illustrates a flow chart of an approach for creating a similarity behavioral cluster. The flow chart depicts a workflow that may be executed for any combination of non-confirmed and confirmed incidents. For example, initially the workflow may be executed to create at least one similarity behavioral cluster from a plurality of detected, but non-confirmed incidents. Furthermore, the workflow may be executed to modify the already created similarity behavioral clusters or to add new similarity behavioral clusters as some of the non-confirmed incidents became confirmed. Moreover, the workflow may be executed to modify the already created similarity behavioral clusters or to add new similarity behavioral clusters as some of the clusters became inactive or obsolete. The process may be also repeated after trustfulness clusters are created or modified.

Once at least one similarity behavioral cluster is created, additional similarity behavioral clusters may be created. The clusters may overlap or may be separated from each other. As the process is repeated, some clusters may become inactive or obsolete, while others may be become larger or smaller. Furthermore as new incidents are detected, new clusters may be created or the existed clusters may be modified.

In step 1010, a plurality of input incident data records are received at a security system. In an embodiment, the plurality of input incident data records includes records of any number of non-confirmed incidents and records any number of confirmed incidents as long as at least two incident data records are received. It should be appreciated that in some situations, a similarity behavioral cluster may be created based on just one incident data record.

In step 1020, a plurality of input incident data records are scanned to identify two or more second incident data records that contain a particular behavioral characteristic value. For example, the plurality of input incident data records can be scanned to identify two or more second incident data records that contain the behavioral characteristic value corresponding to an identifier of a particular behavioral characteristic, such as a volume data characteristic 562 in FIG. 5B.

In step 1030, two or more second incident data records that contain a particular origin characteristic value are compared to a stored table that maps particular sets of behavioral characteristics values to indications of malware. For example, the two or more second incident data records that contain the identifier of a particular behavioral characteristic may be compared to a malicious incident behavioral data table 1102 of FIG. 11B to determine whether the malicious incident behavioral data table 1102 contains an indication that the particular behavioral characteristic is known to be indicative of a malicious attack.

In step 1040, using a table such as a malicious incident behavioral data table 1102 of FIG. 11B, the process determines whether two or more second incident data includes the behavioral characteristic value known to indicate a malicious attack.

In step 1050, the process determines whether the test performed in step 1040 returned a positive result. If so, the process proceeds to step 1060. Otherwise, the process proceeds to step 1020, in which a plurality of input incident data records is scanned again to identify different two or more second incident data records that contain a particular behavioral characteristic value. For example, the process may scan the incident data records to identify this time two or more second incident data records that contain the behavioral characteristic value corresponding to an identifier of a particular behavioral characteristic, such as a persistence data 564 in FIG. 5B.

In step 1060, a similarity behavioral cluster record is created. In an embodiment, creating a similarity behavioral cluster record includes allocating a block of memory or disc space, associating a pointer and or other location identifier to the block of memory or the disc space, and configuring the block of memory or disc space for storing the similarity behavioral cluster record. Furthermore, the process may generate an identifier for the similarity behavioral cluster and store the identifier in the similarity behavioral cluster record.

In an embodiment, creating a similarity behavioral cluster record includes generating an initial severity level value and an initial confidence score and including them in the similarity behavioral cluster record. Generating an initial severity level value may include setting the initial severity level value to a predetermined initial level value, while generating an initial confidence score may include setting the initial confidence score to a predetermined initial score value.

In step 1070, two or more second incident data records, which contain an identifier of a particular behavioral characteristics know to be caused by a malicious attack and which is included in the two or more second incident data records, are included in a similarity behavioral cluster record.

In an embodiment, once steps 1060, 1070 are performed, a similarity behavioral cluster record may include an identifier of the similarity behavioral cluster, an initial severity level value, an initial confidence score, and two or more second incident data records containing the identifier of the particular behavioral characteristic known to be caused by a malicious attack.

In step 1080, at least one initial severity level value and at least one initial confidence score for each of two or more second incidents included in a similarity behavioral cluster are modified. For example, an initial severity level value for a particular second incident may be modified by computing a sum of all initial severity level values associated with the second incidents, and dividing the sum by a count of the second incidents included in the similarity behavioral cluster. The obtained result may be associated with a particular second incident data record associated with the particular second incident and stored in association with the particular second incident record in a similarity behavioral cluster record.

Furthermore, an initial confidence score for a particular second incident may be modified by computing a sum of all initial confidence scores associated with the second incidents, and dividing the sum by a count of the second incidents included in the similarity behavioral cluster. The obtained result may be associated with a particular second incident data record associated with the particular second incident and stored in association with the particular second incident record in a similarity behavioral cluster record.

The process described above is executed for creating a similarity behavioral cluster for incidents most likely caused by attacks known to be malicious. However, the process may also be executed for creating other types of clusters, including a similarity behavioral cluster for incidents most likely caused by attacks known to be benign, or the like. In fact, the process described in FIG. 10 may be used to create any type of similarity behavioral cluster.

The above workflow process may be repeated multiple times. Each time the workflow process is repeated, the previously determined level values and scores may be interpreted as initial level values and initial scores. By repeating the workflow process multiple times, the selection and content of the trustfulness clusters may be refined and improved.

15. Malicious Incident Behavioral Data Tables

FIG. 11A illustrates an example of a malicious incident origin data table 1152. The table depicted in FIG. 11A is one or many data structures that may be used to represent a mapping between sets of origin characteristic values and indications of malware. Other data structures, not depicted in FIG. 11A, may include, but are not limited to including, data structures containing data pointers to storage containers, hierarchical databases and the like.

In an embodiment, a malicious incident origin data table 1152 comprises one or more rows and a plurality of columns. A row in malicious incident origin data table 1152 may be used to store set identifiers of characteristic value sets, one or more origin characteristic values for each of the characteristic value sets, and characteristics of the origin for each characteristic value set.

In an embodiment, a row in malicious incident origin data table 1152 comprises an identifier of a first set 1154, one or more origin characteristic values for the first set 1154, and an indication 1153 that the first set 1154 is known to be associated with attacks known to be launched from an attacker that has launched malicious attacks. In the depicted example, the one or more origin characteristic values for the first set 1154 may include a first origin characteristic value 1155, a second origin characteristic value 1156, a fifth origin characteristic value 1157, and an eighth origin characteristic value 1158. Other examples may include additional origin characteristic values, or may include different sets of the origin characteristic values.

In an embodiment, a row in a malicious incident origin data table 1152 comprises an identifier of a second set 1164, one or more origin characteristic values for the second set 1164, and an indication 1163 that the second set 1164 is known to be associated with attacks known to be launched from an attacker that has launched borderline malicious attacks. In the depicted example, the one or more origin characteristic values for the second set 1164 may include a third origin characteristic value 1165, and a seventh origin characteristic value 1166. Other examples may include additional origin characteristic values, or may include different sets of the origin characteristic values.

16. Malicious Origin Data Tables

FIG. 11B illustrates an example of a malicious incident behavioral data table 1102. The table depicted in FIG. 11B is one or many data structures that may be used to represent a mapping between sets of behavioral characteristic values and indications of malware. Other data structures, not depicted in FIG. 11B, may include, but are not limited to including, data structures containing data pointers to storage containers, hierarchical databases, and the like.

In an embodiment, a malicious incident behavioral data table 1102 comprises one or more rows and a plurality of columns. A row in malicious incident behavioral data table 1102 may be used to store set identifiers of characteristic value sets, one or more behavioral characteristic values for each of the characteristic value sets, and classifications for each characteristic value set.

In an embodiment, a row in malicious incident origin data table 1102 comprises an identifier of a first set 1104, one or more behavioral characteristic values for the first set 1104, and an indication 1103 that the first set 1104 is known to be associated with attacks known to be malicious attacks. In the depicted example, the one or more behavioral characteristic values for the first set 1104 may include a first behavioral characteristic value 1105, a third behavioral characteristic value 1106, and a fourth behavioral characteristic value 1107. Other examples may include additional origin characteristic values, or may include different sets of the origin characteristic values.

In an embodiment, a row in malicious incident origin data table 1102 comprises an identifier of a second set 1124, one or more behavioral characteristic values for the second set 1124, and an indication 1123 that the second set 1124 is known to be associated with attacks known to be borderline malicious attacks. In the depicted example, the one or more behavioral characteristic values for the second set 1124 may include a second behavioral characteristic value 1125, an eight behavioral characteristic value 1126, and a ninth behavioral characteristic value 1127. Other examples may include additional origin characteristic values, or may include different sets of the origin characteristic values.

In an embodiment, a clustering approach allows improving the accuracy in which attacks on computer networks are identified and classified. By creating various types of clusters of incidents, the approach allows confirming whether incidents initially classified as malicious are indeed malicious, whether they are borderline malicious or merely benign. By allowing more accurate and precise classification of the incidents, a security system may generate more accurate reports and may generate more accurate notifications.

In an embodiment, a clustering approach overcomes many shortcomings of network security systems. For example, the clustering approach allows solving the problems when the network security systems incorrectly prioritize the detected incidents or fail to associate correct context to the detected incidents. Furthermore, the clustering approach allows solving the problems when the network security systems incorrectly group the incident data received from multiple networks or multiple systems.

17. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
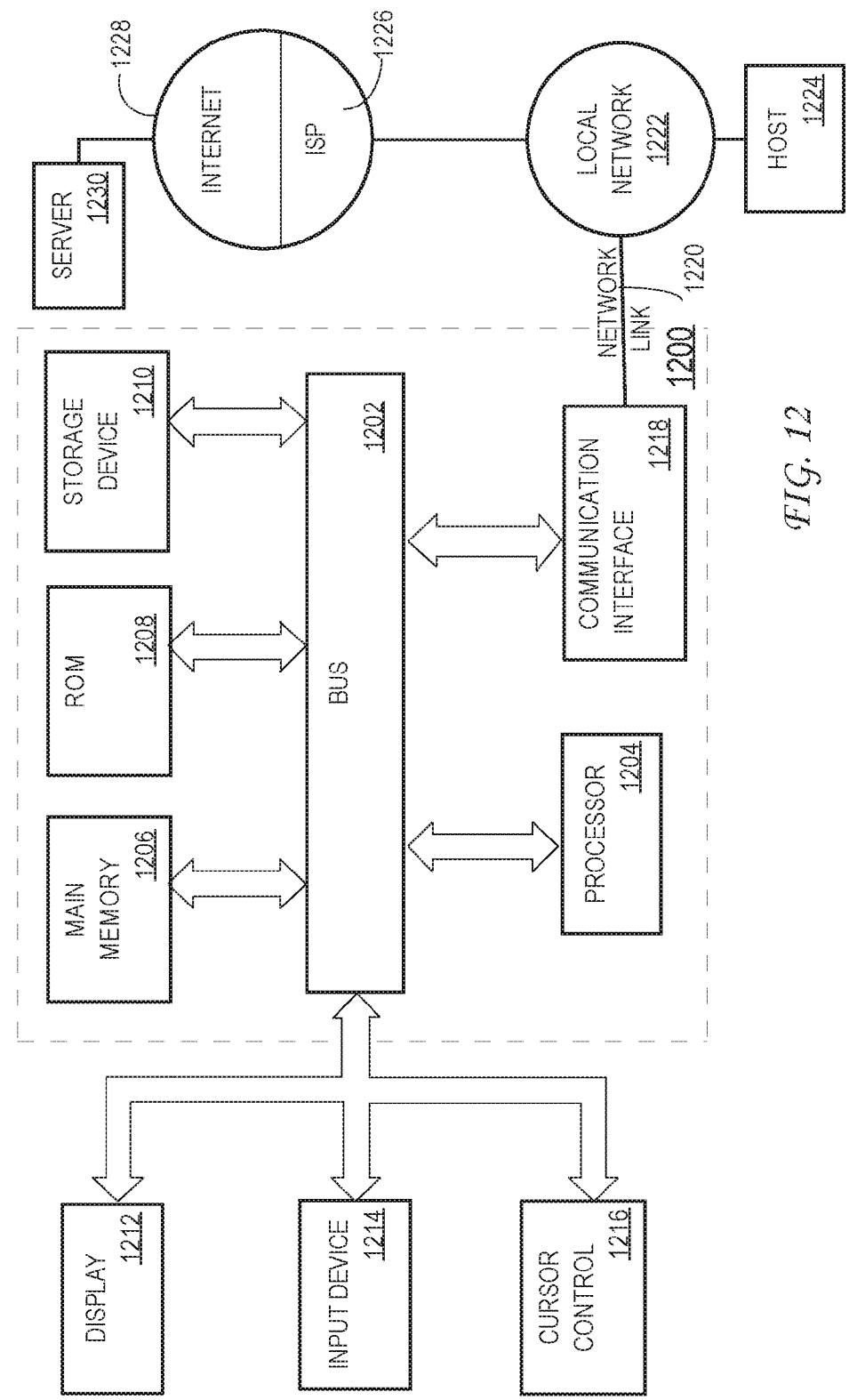
FIG. 12 illustrates a computer system with which various embodiments may be used.

For example, FIG. 12 is a block diagram that illustrates a computer system 1200 upon which an embodiment of the approach may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or solid-state drive is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term storage media as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the Internet 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A data processing method, performed by one or more processors of a computing device, for creating and storing clusters of incident data records based on behavioral characteristic values in the incident data records and origin characteristic values in the incident data records, the method comprising:
    receiving a plurality of input incident data records comprising sets of computer network attribute values determined based upon a plurality of incidents that have occurred in one or more computer networks;
    wherein an incident data record of the plurality of input incident data records comprises at least one or more behavioral characteristic values;
    identifying two or more first incident data records, of the plurality of input incident data records, that have a particular behavioral characteristic value of the one or more behavioral characteristics values;
    determining whether any of the two or more first incident data records has been identified as malicious;
    in response to determining that a first incident data record, from the two or more first incident data records, has been identified as malicious, creating and storing in a computer memory a similarity behavioral cluster record that includes the two or more first incident data records.

2. The data processing method of claim 1,
    wherein the incident data record of the plurality of input incident data records further comprises a severity level value and a confidence score value;
    wherein the two or more first incident data records are of the plurality of input incident data records have the particular behavioral characteristics value of the one or more behavioral characteristics values stored in all of the two or more first incident data records.

3. The data processing method of claim 2, further comprising:
    in response to determining that the first incident data record, from the two or more first incident data records, has been identified as malicious:
        modifying severity level values that are stored in each of the two or more first incident data records by increasing the severity level values by a first value;
        modifying confidence score values that are stored in each of the two or more first incident data records by increasing the confidence score values by a second value;
    determining whether any of the two or more first incident data records has been identified as malicious based on: a malicious incident behavioral data table stored in a data storage device that maps sets of behavioral characteristic values to identifiers of malicious acts in the one or more computer networks, and based on a plurality of comparison operations using the malicious incident behavioral data table and the two or more first incident data records.

4. The data processing method of claim 3, further comprising: modifying the severity level values for each of the two or more first incident data records that are included in the similarity behavioral cluster record based on a severity or a trustfulness associated to the similarity behavioral cluster record.

5. The data processing method of claim 3, wherein the particular behavioral characteristic value is one or more of: data tunneling data, data indicating contacting randomly generated domains, data indicating verifying connections, data indicating issuing periodical polling requests, data indicating tunneling through certain domains and nodes, or data indicating downloading executable files.

6. The data processing method of claim 3, further comprising: determining the similarity behavioral cluster record that has a severity level value by determining an average value of the severity level values of incidents that are included in the similarity behavioral cluster record;
    wherein the severity level value of the incident indicates a maliciousness severity of the incident;
    wherein the confidence score of the incident indicates how close the incident is to a corresponding classified behavior.

7. The data processing method of claim 3, wherein the confidence scores for each of the two or more first incident data records in the similarity behavioral cluster are modified based on one or more of: a size of the similarity behavioral cluster, a count of confirmed infected users, a count of confirmed malicious domains, or whether the similarity behavioral cluster has been verified to be malicious;
    wherein each of the confidence scores has a value between 0% and 100%;
    wherein the value of 100% indicates that incidents included in the similarity behavioral cluster record are confirmed malware incidents.

8. The data processing method of claim 3, wherein the incident data record of the plurality of input incident data records further comprises an origin characteristic value of an originator of an incident, and wherein the method further comprises:
    identifying two or more second incident data records of the plurality of input incident record data, that have a particular origin characteristic value stored in all of the two or more second incident data records;

using a malicious incident origin data table stored in the data storage device that maps sets of origin characteristic values to identifiers of malicious incident origins, and the plurality of comparison operations using the malicious incident origin data table and the two or more second incident data records, determining whether any of the two or more second incident data records has been identified as malicious;

in response to determining that a second incident data record, from the two or more second incident data records, has been identified as malicious:
creating and storing in the computer memory a trustfulness cluster record that includes the two or more second incident data records;
modifying severity level values that are stored in each of the two or more second incident data records by increasing the severity level values by a third value;
modifying confidence scores that are stored in each of the two or more second incident data records by increasing the confidence score values by a fourth value;
determining a trustfulness level value for the trustfulness cluster record.

9. The data processing method of claim 8, wherein each incident data record, from the plurality of input incident data records, is initially assigned an initial severity level value and an initial confidence score.

10. The data processing method of claim 8, wherein the particular origin characteristic value is one or more of: a network domain identifier, a network domain name, an IP address of a device, an IP address of a group of devices, an email address of a user, or an IP address of a user device.

11. A device comprising:
a memory unit;
one or more processors of a computing device configured as a server, configured to perform instructions stored in the memory unit, for creating and storing clusters of incident data records based on behavioral characteristic values in the incident data records and origin characteristic values in the incident data records, wherein execution of the instructions by the processors causes:
receiving a plurality of input incident data records comprising sets of computer network attribute values determined based upon a plurality of incidents that have occurred in one or more computer networks;
wherein an incident data record of the plurality of input incident data records comprises at least one or more behavioral characteristic values;
identifying two or more first incident data records, of the plurality of input incident data records, that have a particular behavioral characteristic value of the one or more behavioral characteristics values;
determining whether any of the two or more first incident data records has been identified as malicious;
in response to determining that a first incident data record, from the two or more first incident data records, has been identified as malicious, creating and storing in a computer memory a similarity behavioral cluster record that includes the two or more first incident data records.

12. The device of claim 11,
wherein the incident data record of the plurality of input incident data records further comprises a severity level value and a confidence score value;
wherein the two or more first incident data records are of the plurality of input incident data records have the particular behavioral characteristics value of the one or more behavioral characteristics values stored in all of the two or more first incident data records.

13. The device of claim 12, wherein the one or more processors execute additional instructions, an execution of which causes:
in response to determining that the first incident data record, from the two or more first incident data records, has been identified as malicious:
modifying severity level values that are stored in each of the two or more first incident data records by increasing the severity level values by a first value;
modifying confidence score values that are stored in each of the two or more first incident data records by increasing the confidence score values by a second value;
determining whether any of the two or more first incident data records has been identified as malicious based on: a malicious incident behavioral data table stored in a data storage device that maps sets of behavioral characteristic values to identifiers of malicious acts in the one or more computer networks, and based on a plurality of comparison operations using the malicious incident behavioral data table and the two or more first incident data records.

14. The device of claim 13, wherein the one or more processors execute additional instructions, an execution of which causes: modifying the severity level values for each of the two or more first incident data records that are included in the similarity behavioral cluster record based on a severity or a trustfulness associated to the similarity behavioral cluster record.

15. The device of claim 13, wherein the particular behavioral characteristic value is one or more of: data tunneling data, data indicating contacting randomly generated domains, data indicating verifying connections, data indicating issuing periodical polling requests, data indicating tunneling through certain domains and nodes, or data indicating downloading executable files.

16. The device of claim 13, wherein the one or more processors execute additional instructions, an execution of which causes:
determining the similarity behavioral cluster record that has a severity level value by determining an average value of the severity level values of incidents that are included in the similarity behavioral cluster record;
wherein the severity level value of the incident indicates a maliciousness severity of the incident;
wherein the confidence score of the incident indicates how close the incident is to a corresponding classified behavior.

17. The device of claim 13, wherein the confidence scores for each of the two or more first incident data records in the similarity behavioral cluster are modified based on one or more of: a size of the similarity behavioral cluster, a count of confirmed infected users, a count of confirmed malicious domains, or whether the similarity behavioral cluster has been verified to be malicious;
wherein each of the confidence scores has a value between 0% and 100%;
wherein the value of 100% indicates that incidents included in the similarity behavioral cluster record are confirmed malware incidents.

18. The device of claim 13, wherein the incident data record of the plurality of input incident data records further comprises an origin characteristic value of an originator of an incident; and wherein the one or more processors execute additional instructions, execution of which causes:

identifying two or more second incident data records of the plurality of input incident record data, that have a particular origin characteristic value stored in all of the two or more second incident data records;

using a malicious incident origin data table stored in the data storage device that maps sets of origin characteristic values to identifiers of malicious incident origins, and the plurality of comparison operations using the malicious incident origin data table and the two or more second incident data records, determining whether any of the two or more second incident data records has been identified as malicious;

in response to determining that a second incident data record, from the two or more second incident data records, has been identified as malicious:

creating and storing in the computer memory a trustfulness cluster record that includes the two or more second incident data records;

modifying severity level values that are stored in each of the two or more second incident data records by increasing the severity level values by a third value;

modifying confidence scores that are stored in each of the two or more second incident data records by increasing the confidence score values by a fourth value;

determining a trustfulness level value for the trustfulness cluster record.

19. The device of claim 18, wherein each incident data record, from the plurality of input incident data records, is initially assigned an initial severity level value and an initial confidence score.

20. The device of claim 18, wherein the particular origin characteristic value is one or more of: a network domain identifier, a network domain name, an IP address of a device, an IP address of a group of devices, an email address of a user, or an IP address of a user device.

* * * * *